(12) United States Patent
Mabe et al.

(10) Patent No.: US 11,512,761 B2
(45) Date of Patent: Nov. 29, 2022

(54) POWER TRANSMISSION SHAFT AND METHOD FOR MANUFACTURING SAME

(71) Applicant: HITACHI AUTOMOTIVE SYSTEMS, LTD., Hitachinaka (JP)

(72) Inventors: Yasutomo Mabe, Akiruno (JP); Kiyokazu Nakane, Kanagawa (JP); Hiromichi Komai, Hadano (JP); Xiaojin Zhu, Atsugi (JP); Toshiyuki Masuda, Atsugi (JP); Kenichiro Ishikura, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 470 days.

(21) Appl. No.: 16/612,496

(22) PCT Filed: May 18, 2018

(86) PCT No.: PCT/JP2018/019227
§ 371 (c)(1),
(2) Date: Nov. 11, 2019

(87) PCT Pub. No.: WO2019/003702
PCT Pub. Date: Jan. 3, 2019

(65) Prior Publication Data
US 2020/0116229 A1    Apr. 16, 2020

(30) Foreign Application Priority Data

Jun. 30, 2017  (JP) .............................. JP2017-128537

(51) Int. Cl.
*F16F 15/34*    (2006.01)
*F16F 15/32*    (2006.01)
(Continued)

(52) U.S. Cl.
CPC .............. *F16F 15/322* (2013.01); *C09D 5/10* (2013.01); *F16C 3/023* (2013.01); *F16C 11/06* (2013.01);
(Continued)

(58) Field of Classification Search
CPC .......... F16F 15/34; F16F 15/322; F16F 15/28; F16C 3/023; F16C 15/00; F16C 11/06
See application file for complete search history.

(56) References Cited

U.S. PATENT DOCUMENTS 4,887,989 A * 12/1989 Kerecman ............... F16C 3/023
464/180
4,998,448 A * 3/1991 Ellis, Jr. .................. F16F 15/32
156/330
(Continued)

FOREIGN PATENT DOCUMENTS

JP   H02-120129 A   5/1990
JP   H06-235415 A   8/1994
(Continued)

OTHER PUBLICATIONS

International Search Report issued in corresponding application No. PCT/JP2018/019227 dated Aug. 7, 2018.
(Continued)

*Primary Examiner* — Vishal R Sahni
(74) *Attorney, Agent, or Firm* — Foley & Lardner LLP

(57) ABSTRACT

A propeller shaft (1) that is a power transmission shaft has a shaft member (2) as a tubular body made of iron-based metal and a balance weight (3) made of iron-based metal and welded to an outer peripheral surface of this shaft member (2). At least a part of the balance weight (3) of the propeller shaft (1) is covered with a sacrificial metal coating (4) made of sacrificial corrosion prevention material that contains metal whose ionization tendency is higher than that of metal
(Continued)

forming the shaft member (2). With this, it is possible to suppress local progression of corrosion at a periphery of the balance weight (3) and improve durability of the propeller shaft (1).

14 Claims, 16 Drawing Sheets

(51) Int. Cl.
| | |
|---|---|
| *F16C 3/02* | (2006.01) |
| *F16C 11/06* | (2006.01) |
| *F16C 15/00* | (2006.01) |
| *F16F 15/28* | (2006.01) |
| *C09D 5/10* | (2006.01) |

(52) U.S. Cl.
CPC .............. *F16C 15/00* (2013.01); *F16F 15/28* (2013.01); *F16F 15/34* (2013.01); *F16C 2223/30* (2013.01)

(56) References Cited

U.S. PATENT DOCUMENTS

| | | | |
|---|---|---|---|
| 5,722,896 A | 3/1998 | Beagley et al. | |
| 6,050,900 A * | 4/2000 | Reinhardt | F16F 15/322 |
| | | | 464/180 |
| 6,619,119 B1 * | 9/2003 | Duggan | G01M 1/24 |
| | | | 73/487 |
| 2017/0261066 A1 * | 9/2017 | Springer | F16F 15/322 |
| 2018/0051771 A1 * | 2/2018 | Nijakowski | B23K 26/21 |
| 2020/0116229 A1 | 4/2020 | Mabe et al. | |

FOREIGN PATENT DOCUMENTS

| | | |
|---|---|---|
| JP | H11-125312 A | 5/1999 |
| JP | 2001-193795 A | 7/2001 |
| JP | 2004-148957 A | 5/2004 |
| JP | 2011-12775 A | 1/2011 |
| JP | 2015-113964 A | 6/2015 |
| JP | 2015-135144 A | 7/2015 |
| WO | WO-2016/154239 A1 | 9/2016 |
| WO | WO-2019/003702 A1 | 1/2019 |

OTHER PUBLICATIONS

Written Opinion issued in corresponding application No. PCT/JP2018/019227 dated Aug. 7, 2018.
Notice of Reasons for Refusal dated Feb. 1, 2022 issued in JP Application No. 2021-050910, with English translation, 8 pages.

* cited by examiner

FIG. 10
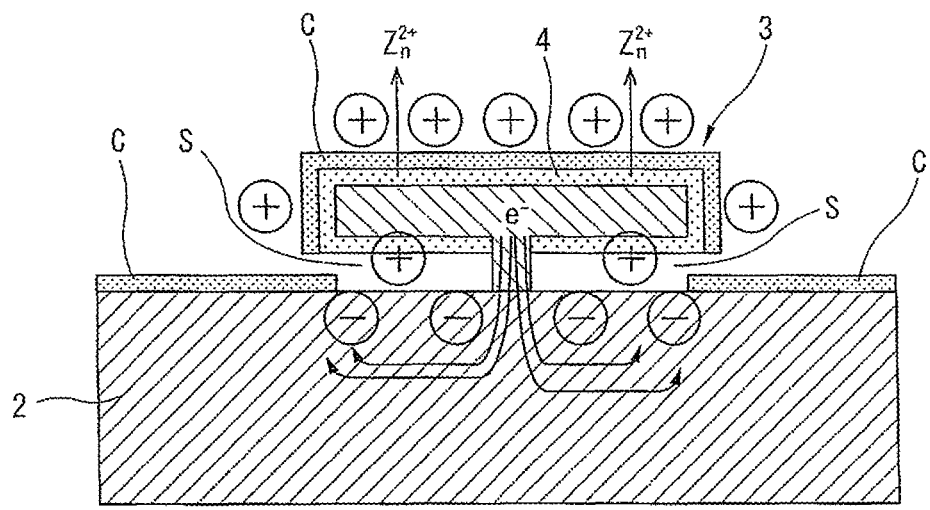
FIG. 11A  FIG. 11B
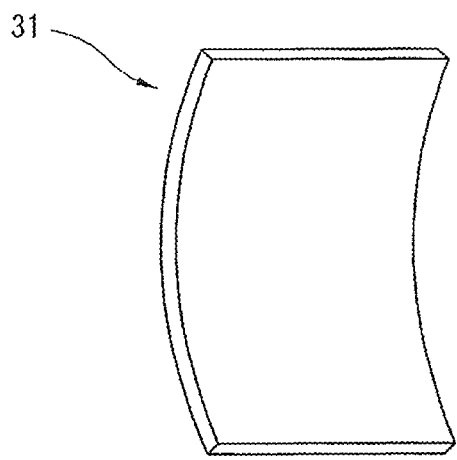 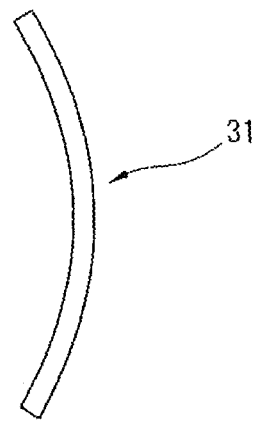

FIG. 19
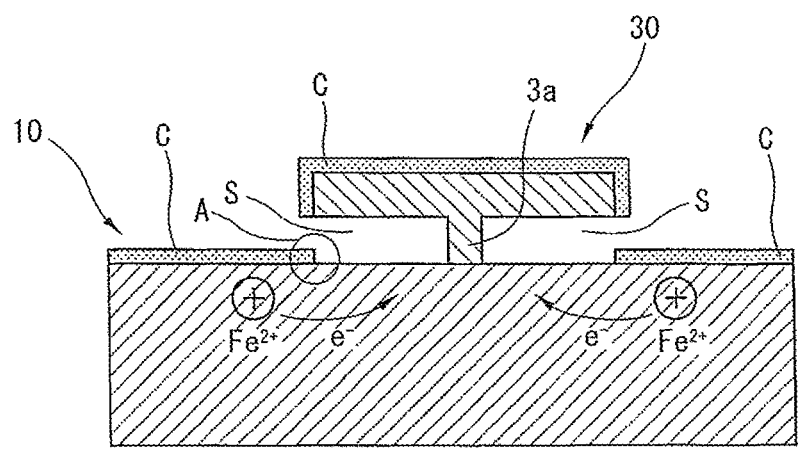
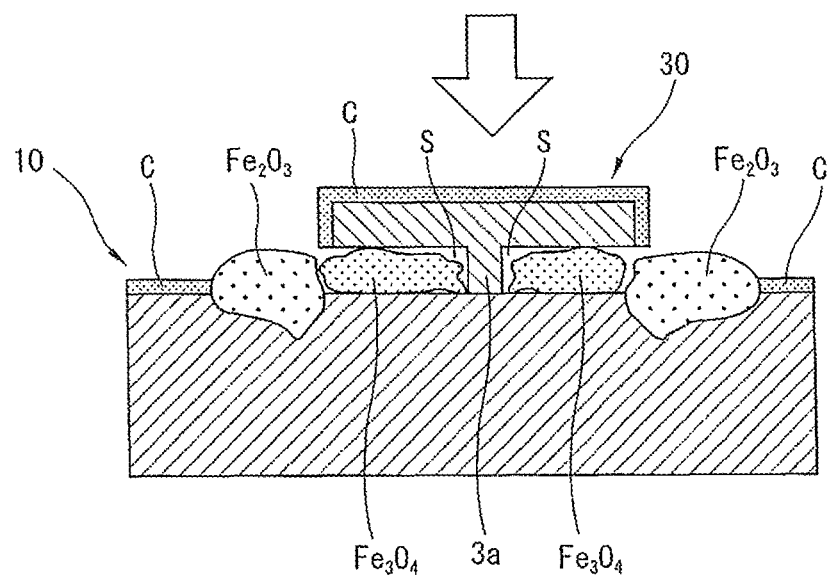

POWER TRANSMISSION SHAFT AND METHOD FOR MANUFACTURING SAME

TECHNICAL FIELD

The present invention relates to a power transmission shaft and its manufacturing method.

BACKGROUND ART

As a related art power transmission shaft, for instance, a propeller shaft disclosed in the following Patent Document 1 is known.

That is, by welding a substantially plate-shaped balance weight made of iron-based metal to an outer peripheral surface of a steel pile of this power transmission shaft, weight balance in a rotation direction of the power transmission shaft is adjusted. Further, after the balance weight is welded, for instance, a surface of the power transmission shaft is spray-coated or paint-coated, then rust prevention of the power transmission shaft is made.

CITATION LIST

Patent Document

Patent Document 1: Japanese Unexamined Patent Publication No. JP2004-148957

SUMMARY OF THE INVENTION

Technical Problem

In the case of the related art power transmission shaft, however, even though the power transmission shaft is subjected to the rust prevention treatment by spraying or painting, corrosion (occurrence of red rust) locally proceeds or develops at a periphery of the balance weight. Due to this corrosion, a dynamic torsional stress concentrates at a local corrosion portion upon transmitting the power, and this causes a problem of losing long-term durability of the power transmission shaft.

The present invention was made in view of the above technical problem. An object of the present invention is therefore to provide a power transmission shaft and its manufacturing method which are capable of suppressing the local progression (or the local development) of the corrosion at the periphery of the balance weight and improving the durability of the power transmission shaft.

Solution to Problem

According to one aspect of the present invention, at least a part of a balance weight is covered with sacrificial corrosion prevention material that contains metal whose ionization tendency is higher than that of metal forming a tubular body.

According to another aspect of the present invention, at least a part of the balance weight could be provided with a sacrificial metal whose ionization tendency is higher than that of metal forming the tubular body.

Further, it is preferable to manufacture a power transmission shaft of the present invention by a method comprising a process of preparing a plurality of balance weights, weights of which are different from each other and at least parts of which are each covered with sacrificial corrosion prevention material that contains metal whose ionization tendency is higher than that of metal forming the tubular body; a process of determining a fixing position to the tubular body and weight of the balance weight according to a rotation imbalance of the power transmission shaft; a process of welding the determined balance weight to the tubular body; and a process of coating the tubular body including the balance weight.

Effects of Invention

According to the present invention, it is possible to suppress the local progression (or the local development) of the corrosion at the periphery of the balance weight and improve the durability of the power transmission shaft.

BRIEF DESCRIPTION OF THE DRAWINGS

FIG. 2A is a plate-shaped balance weight having a relatively large weight. FIG. 2B is a bar-shaped balance weight having a relatively small weight. FIG. 2C is a longitudinal cross section of FIGS. 2A and 2B.

FIG. 3A is a plate-shaped balance weight having a relatively large weight. FIG. 3B is a bar-shaped balance weight having a relatively small weight. FIG. 3C is a longitudinal cross section of FIGS. 3A and 3B.

FIG. 4A is a perspective view. FIG. 4B is a side view.

FIG. 5A is a perspective view. FIG. 5B is a side view.

FIG. 6A is a sacrificial metal coating formed on an outer side surface of the balance weight. FIG. 6B is a sacrificial metal coating formed on an inner side surface of the balance weight. FIG. 6C is a sacrificial metal coating formed on the outer and inner side surfaces of the balance weight. FIG. 6D is a sacrificial metal coating formed on the outer and inner side surfaces and an outer peripheral surface of the balance weight.

FIG. 10 is a conceptual diagram showing a mechanism of sacrificial corrosion prevention according to the first embodiment of the present invention.

FIGS. 11A and 11B are a modified example of the first embodiment of the present invention, showing a spot welding type balance weight. FIG. 11A is a perspective view. FIG. 11B is a side view.

FIG. 13A is a perspective view. FIG. 13B is a side view.

FIG. 14A is a sectional view of the propeller shaft, showing a process of welding a rivet. FIG. 14B is a sectional view of the propeller shaft, showing a process of inserting a weight body onto the rivet. FIG. 14C is a sectional view of the propeller shaft, showing a process of riveting the rivet.

FIG. 16A is a case where a sacrificial metal is placed at an inner side of the balance weight. FIG. 16B is a case where the sacrificial metal is placed at an outer side of the balance weight.

FIG. 17A is a sectional view of the propeller shaft, showing a process of welding a rivet. FIG. 17B is a sectional view of the propeller shaft, showing a process of fixing the sacrificial metal. FIG. 17C is a sectional view of the propeller shaft, showing a process of fixing the balance weight. FIG. 17D is a sectional view of the propeller shaft, showing a process of riveting the rivet.

FIG. 19 is a conceptual diagram showing a mechanism of progression of corrosion according to the related art propeller shaft.

EMBODIMENTS FOR CARRYING OUT THE INVENTION

Embodiments of a power transmission shaft and its manufacturing method according to the present invention will be explained in detail below with reference to the drawings. In the following embodiments, in the same manner as the related art, the power transmission shaft of the present invention is applied to a propeller shaft for a vehicle.

(Structure of Propeller Shaft)

Figure 1:
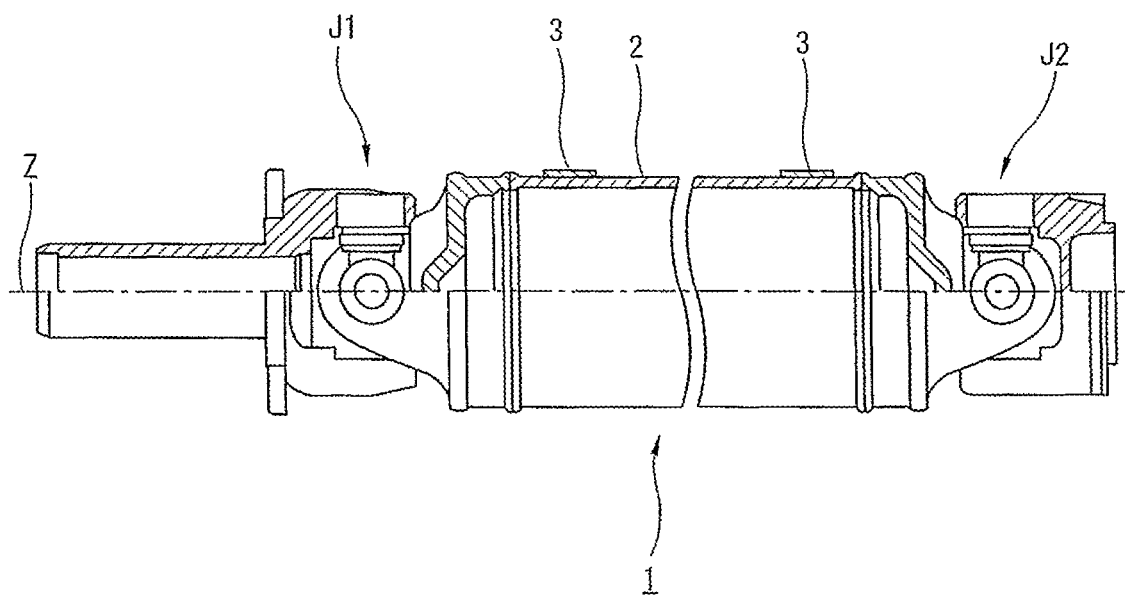
FIG. 1 is a drawing partly showing a longitudinal cross section of a propeller shaft to which a power transmission shaft of the present invention is applied.

FIG. 1 shows an entire shape of a propeller shaft 1 with half of the propeller shaft illustrated as a longitudinal cross section. In the explanation of this drawing, for the sake of convenience, a left side of the drawing is called a "front", and a right side of the drawing is called a "rear". Further, a direction along a rotation axis Z of the propeller shaft 1 is called an "axis direction", and a rotation direction about the rotation axis z is called a "circumferential direction".

As shown in FIG. 1, this propeller shaft 1 has a shaft member 2 that transmits a driving force of a driving source (not shown). The shaft member 2 is provided at front and rear ends thereof with joints J1 and J2.

As described above, a front end side of the propeller shaft 1 is connected to a transmission device (not shown), and a rear end side of the propeller shaft 1 is connected to an actuator (not shown), then the propeller shaft 1 transmits power inputted from the transmission device side to the actuator side.

Further, a balance weight 3 that is made of plate-shaped iron-based metal, as a weight to correct rotation imbalance of the propeller shaft 1, is fixed to an outer peripheral surface of the shaft member 2. More specifically, the balance weight 3 having a sufficient weight to redress the rotation imbalance is provided at an opposite side to a portion where the rotation imbalance of the shaft member 2 occurs with respect to the rotation axis Z. With this, the rotation imbalance is corrected, and vibration and resonance of the propeller shaft 1, caused by the rotation imbalance, are suppressed.

First Embodiment

FIGS. 2A and 2B to FIG. 10 show a first embodiment of the power transmission shaft and its manufacturing method of the present invention. In the present embodiment, the balance weight 3 is fixed to the shaft member 2 by projection welding.

(Structure of Balance Weight)

Figure 2A:
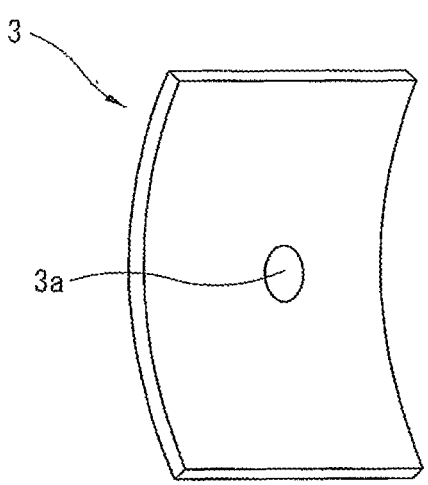
FIGS. 2A to 2C are one-point fixing type balance weights according to a first embodiment of the present invention.
Figure 2B:
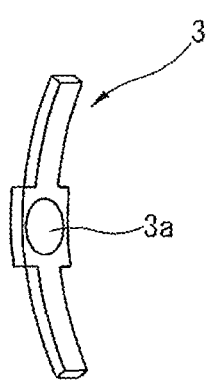
Figure 3A:
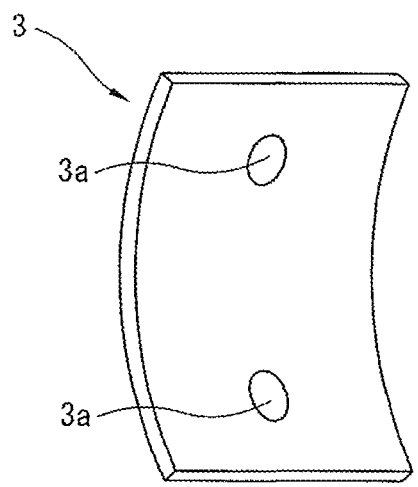
FIGS. 3A to 3C are two-point fixing type balance weights according to the first embodiment of the present invention.
Figure 3B:
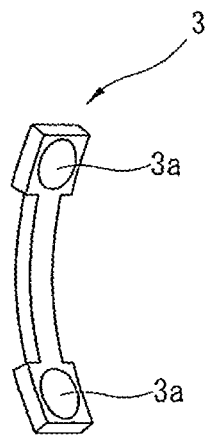
Figure 3C:
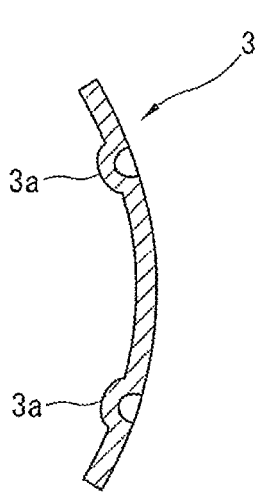
Figure 4A:
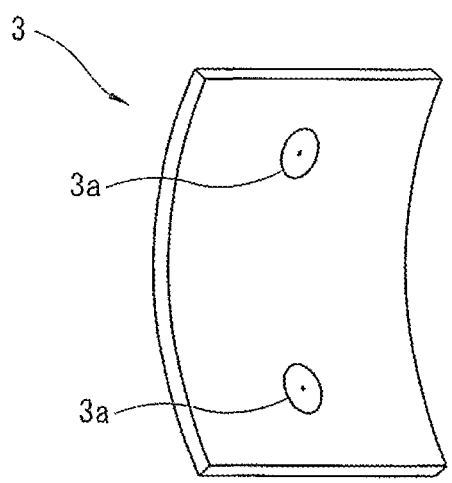
FIGS. 4A and 4B show modified examples of the two-point fixing type balance weights shown in FIG. 3A.
Figure 4B:
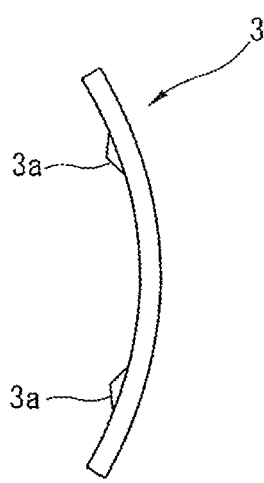
Figure 5A:
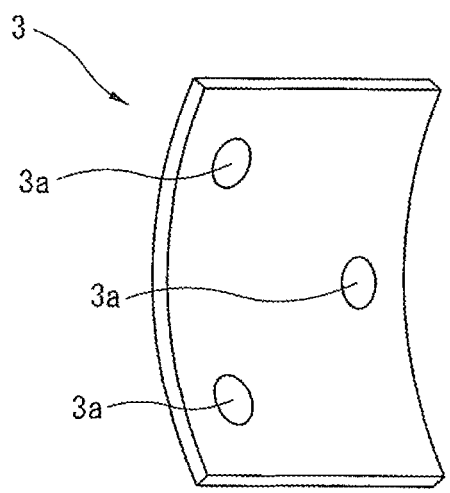
FIGS. 5A and 5B are three-point fixing type balance weights according to the first embodiment of the present invention.
Figure 5B:
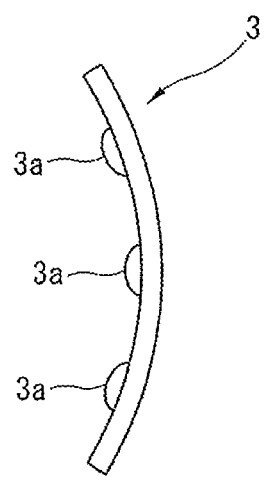

FIGS. 2A and 2B to FIGS. 5A and 5B show a variety of projection-welded balance weights 3. FIGS. 2A to 2C are one-point fixing type balance weights. FIG. 2A is a plate-shaped balance weight having a relatively large weight. FIG. 2B is a bar-shaped balance weight having a relatively small weight. FIG. 2C is a longitudinal cross section of FIGS. 2A and 2B. FIGS. 3A to 3C are two-point fixing type balance weights. FIG. 3A is a plate-shaped balance weight having a relatively large weight. FIG. 3B is a bar-shaped balance weight having a relatively small weight. FIG. 3C is a longitudinal cross section of FIGS. 3A and 3B. FIGS. 4A and 4B show modified examples of the two-point fixing type balance weights shown in FIG. 3A. FIG. 4A is a perspective view. FIG. 4B is a side view. FIGS. 5A and 5B are three-point fixing type balance weights. FIG. 5A is a perspective view. FIG. 5B is a side view.

As shown in FIGS. 2A, 2C, 3A, 3C, 4A, 4B, 5A and 5B, the balance weight 3 is a substantially rectangular-shaped plate member having a substantially even thickness (a substantially even plate thickness) and extending in the circumferential direction of the shaft member 2 so as to be a rectangle viewed from above. Further, the balance weight 3 is formed so as to be curved in the circumferential direction with a curvature corresponding to a curvature of the outer peripheral surface of the shaft member 2. Here, as other shape of the balance weight 3, regarding the balance weight having a relatively small weight, for instance, as shown in FIGS. 2B and 3B, it could be the long narrow bar-shaped balance weight having a substantially even thickness and extending while curving along the circumferential direction of the shaft member 2.

Further, as shown in FIGS. 2A to 2C to 5A and 5B, a projecting portion 3a, as a welded projection that projects from an outer side to an inner side of the balance weight 3, is formed on an inner side surface of the balance weight 3 according to the number of welding points. This projecting portion 3a is formed integrally with the plate member by extruding a part of the plate member from an outer side to an inner side of the plate member. Then, the balance weight 3 is projection-welded to the shaft member 2 through the projecting portion 3a.

Figure 2C:
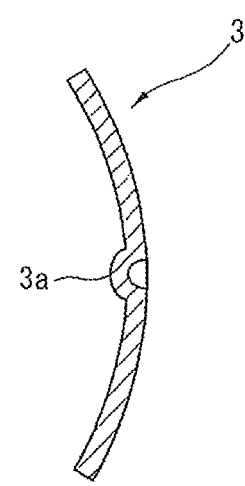

As a shape of the projecting portion 3a, as shown in FIGS. 2C, 3C and 5C, it is a substantially spherical shape whose cross section is a substantially arc shape. Further, as shown in FIG. 4A, it could be a sharp-pointed projection, i.e. a substantially conical shape whose cross section is a substantially triangular shape. Especially in the case where the projecting portion 3a is formed into the sharp-pointed projection as shown in FIG. 4A, when performing the welding (when applying pressure), an after-described sacrificial metal coating 4 (see FIGS. 6A to 6D) that is formed at a top end of the projecting portion 3a easily comes off, then as a merit, a strong junction by a good energization (a good electric current passage) is secured.

Figure 6A:
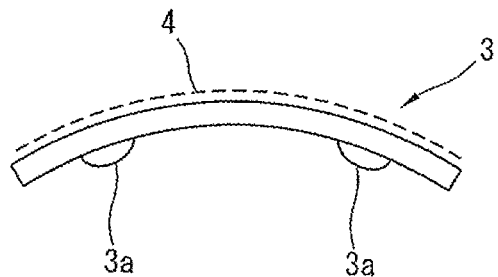
FIGS. 6A to 6D show forming patterns of sacrificial metal coating formed at the balance weight shown in FIGS. 3A and 3B.
Figure 6B:
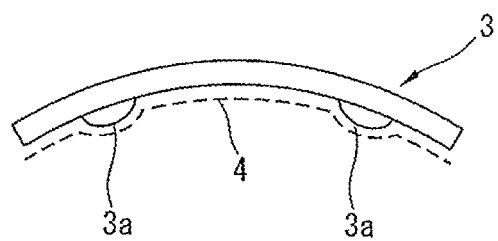
Figure 6C:
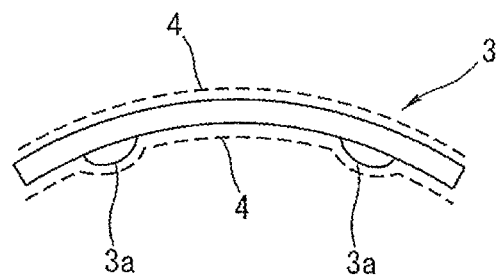
Figure 6D:
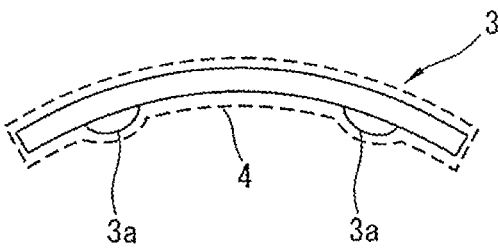

FIGS. 6A to 6D show a variety of forming patterns of the sacrificial metal coating 4 formed at the balance weight 3 shown in FIGS. 3A and 3B. FIG. 6A shows the sacrificial metal coating 4 formed on an outer side surface of the balance weight 3. FIG. 6B shows the sacrificial metal coating 4 formed on an inner side surface of the balance weight 3. FIG. 6C shows the sacrificial metal coating 4 formed on the outer and inner side surfaces of the balance weight 3. FIG. 6D shows the sacrificial metal coating 4 formed on the outer and inner side surfaces and an outer peripheral surface of the balance weight 3.

As shown in FIGS. 6A to 6D, at least a part of the balance weight 3 is covered with the sacrificial metal coating 4 made of sacrificial metal material that contains metal whose ionization tendency is higher than that of metal (in the present embodiment, iron-based metal) forming the shaft member 2. Here, as the sacrificial metal material, for instance, it is zinc, magnesium, aluminum and an alloy containing at least one of these metals. In the present embodiment, zinc is used.

The sacrificial metal coating 4 could be formed at a part of the balance weight 3, for instance, on only an outer side surface 3b of the balance weight 3 as shown in FIG. 6A, on only an inner side surface 3c of the balance weight 3 as shown in FIG. 6B, and on only both of the outer side surface 3b and the inner side surface 3c of the balance weight 3. Further, the sacrificial metal coating 4 could be formed on an entire surface of the balance weight 3 as shown in FIG. 6D, i.e. on all of the outer side surface 3b, the inner side surface 3c and an outer side surface 3d of the balance weight 3. Although an after-mentioned sacrificial corrosion prevention effect can be obtained by any pattern, in particular, the larger the surface area of the sacrificial metal coating 4 is, the longer the after-mentioned sacrificial corrosion prevention effect can be maintained.

The sacrificial metal coating 4 can be partly formed at the balance weight 3 by e.g. electroplating or spraying, for instance, before or after welding the balance weight 3. Further, the sacrificial metal coating 4 could be formed at the balance weight 3 by molding the balance weight 3 from a steel plate (or a steel sheet) on which the sacrificial metal coating 4 is previously provided, such as press-molding of a plating steel plate (or a plating steel sheet) as described later. It is desirable, among the forming patterns of the sacrificial metal coating 4, that the entire surface of the balance weight 3 should be covered with the sacrificial metal coating 4 by adding the sacrificial metal coating 4 to an outer peripheral surface (a cutting surface) after the after-mentioned plating steel sheet is press-molded.

(Manufacturing Method of Propeller Shaft)

Figure 7:
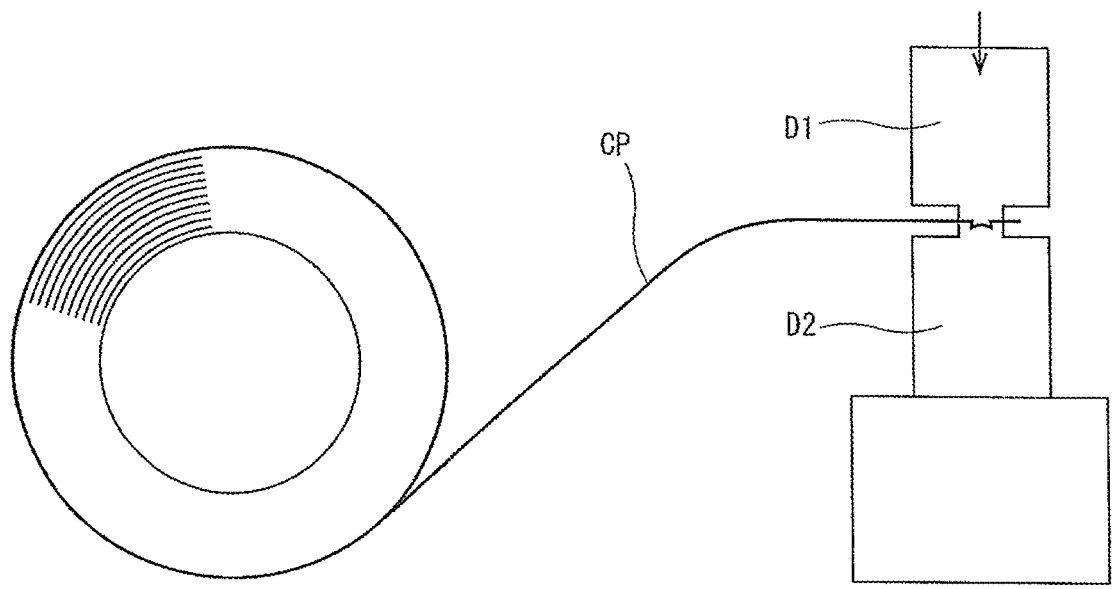
FIG. 7 is a schematic view of a press-molding machine of the balance weight.
Figure 8:
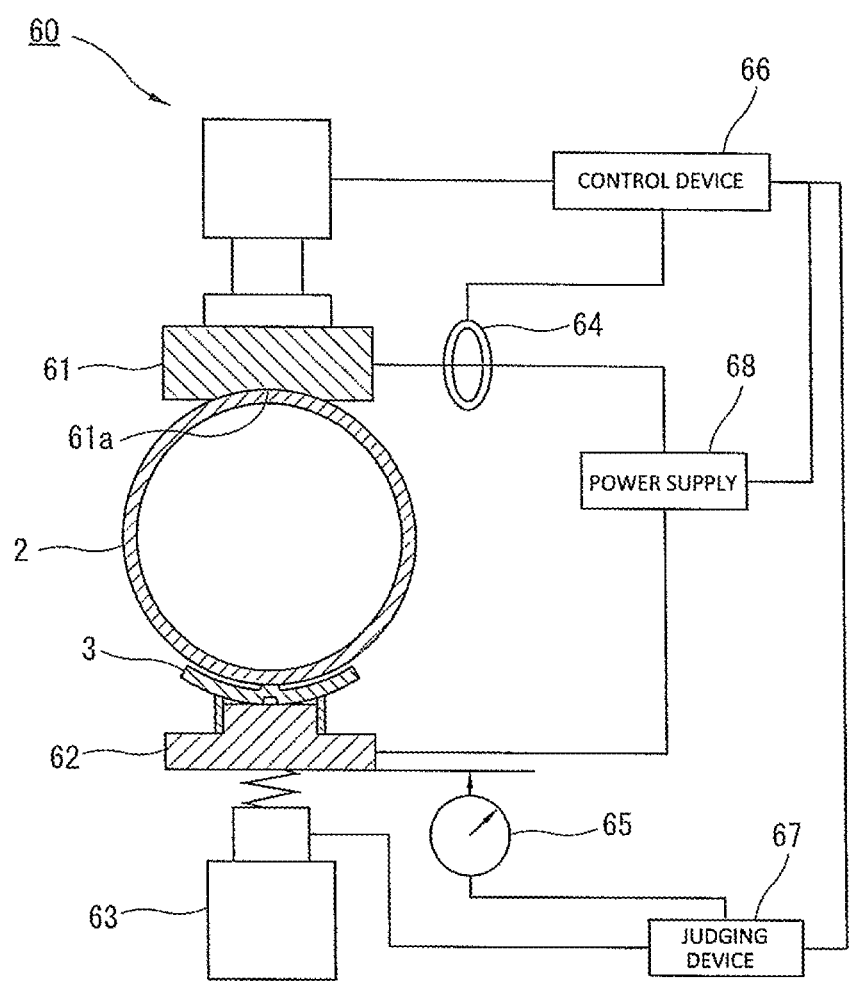
FIG. 8 is a schematic view of a projection welding device of the balance weight.
Figure 9:
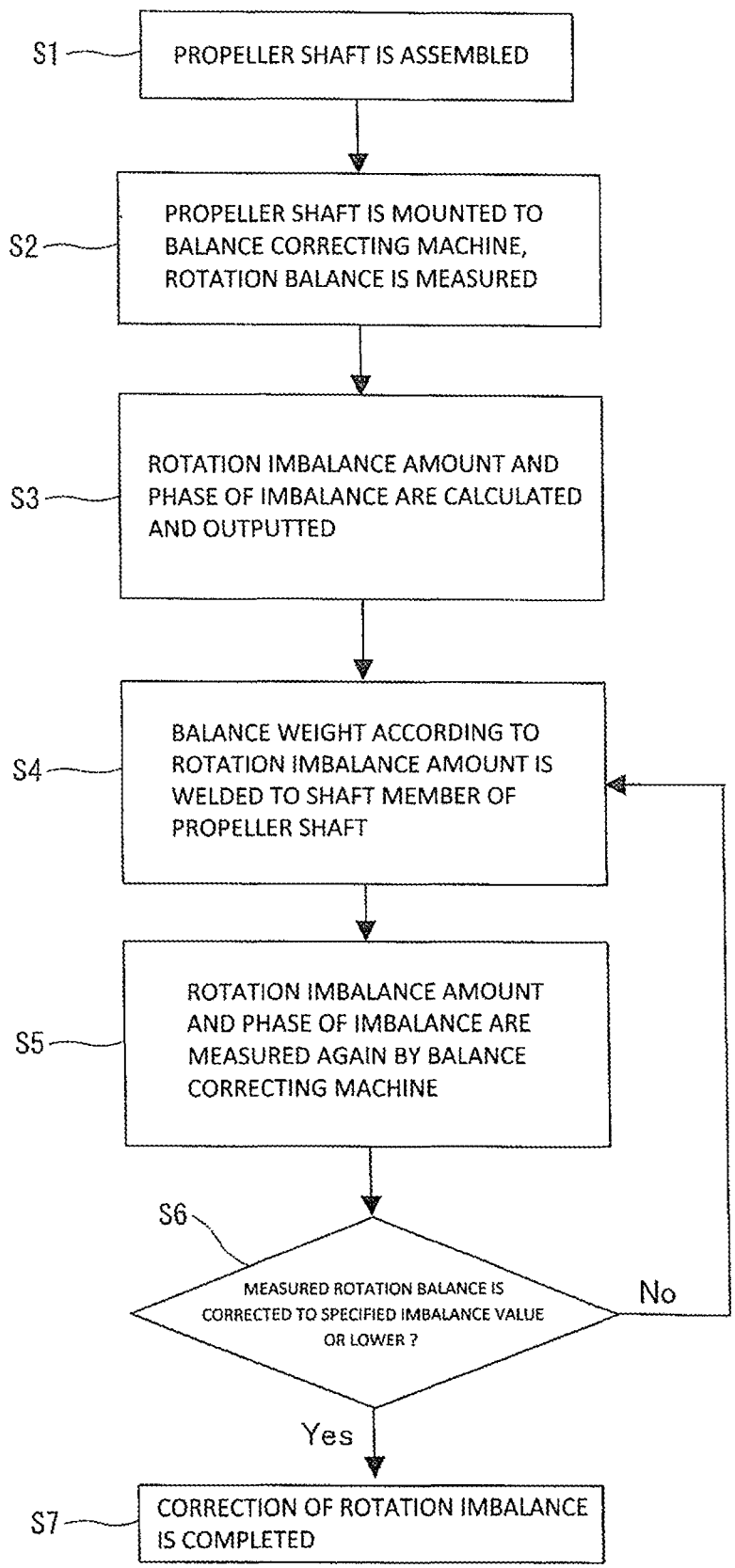
FIG. 9 is a flow chart showing a fixing procedure of the balance weight.

A manufacturing method of the power transmission shaft according to the present invention, especially a fixing method of the balance weight 3, will be explained below with reference to FIGS. 7 to 9. FIG. 7 is a schematic view of a press-molding machine of the balance weight 3. FIG. 8 is a schematic view of a projection welding device of the balance weight 3. FIG. 9 is a flow chart showing a fixing procedure of the balance weight 3.

First, a plurality of balance weights 3, weights of which are different from each other and at least parts of which are each covered with the sacrificial metal coating 4 made of sacrificial corrosion prevention material (in the present embodiment, zinc) that contains metal whose ionization tendency is higher than that of metal (iron-based metal) forming the shaft member 2, are prepared.

That is, as shown in FIG. 7, a well-known coil-like wound plating steel sheet CP that is band-shaped material, both of the outer side surface 3b and the inner side surface 3c of which are previously provided with the sacrificial metal coating 4, is press-molded, then the balance weight 3 provided with the sacrificial metal coating 4 is produced. More specifically, a top end of the coil-like wound plating steel sheet CP is drawn in and sandwiched between an upper die D1 and a lower die D2, and stamped out (die-cut) by a punch (not shown) provided at the upper die D1, then the balance weight 3 is molded. It is noted that each projecting portion 3a shown in FIGS. 2A to 2C to FIGS. 5A and 5B is also formed in the molding process. The above corresponds to a "process of preparing the balance weight" according to the present invention.

Subsequently, the balance weight 3 is fixed to the propeller shaft 1 along the flow chart shown in FIG. 9. That is, after the propeller shaft 1 is assembled (step S1), by rotating this propeller shaft 1 with the propeller shaft 1 mounted to a balance correcting machine (not shown), a rotation balance of the propeller shaft 1 is measured (step S2). Then, a rotation imbalance amount of the propeller shaft 1 and a phase of this imbalance are calculated and outputted by the balance correcting machine (not shown) (step S3). The above corresponds to a "process of determining a fixing position and weight of the balance weight" according to the present invention.

Next, on the basis of a measurement result by the balance correcting machine, the balance weight 3 according to the rotation imbalance amount is fixed to the shaft member 2 of the propeller shaft 1 (step S4).

More specifically, in a projection welding device 60 as shown in FIG. 8, on the basis of the measurement result, the shaft member 2 is supported by a lower side recessed portion 61a of an upper electrode 61 as a fixed electrode so that a fixing position of the balance weight 3 faces a lower electrode 62. On the other hand, the balance weight 3 having a weight that is selected on the basis of the measurement result is mounted on the lower electrode 62 as a movable electrode. Then, by moving up the lower electrode 62 and applying power to the balance weight 3 and the shaft member 2 with an inner peripheral side (the projecting portion 3a) of the balance weight 3 being pressed against the outer peripheral surface of the shaft member 2, the projecting portion 3a is fused, and the balance weight 3 is welded to the outer peripheral surface of the shaft member 2. The above corresponds to a "process of welding the balance weight to a tubular body (or a cylindrical body)" according to the present invention.

In FIG. 8, a reference sign 63 denotes a cylinder that moves up and down the lower electrode 62. A reference sign 64 denotes a detection coil that detects current that is applied to the upper electrode 61. A reference sign 65 denotes a displacement sensor that measures a displacement amount of the lower electrode 62. A reference sign 66 denotes a control device that controls a power supply 68 on the basis of a detection result of the detection coil 64. A reference sign 67 denotes a judging device that judges pass/fail of the welding on the basis of a judgment result of the displacement sensor 65.

Following the welding of the balance weight 3, the rotation balance of the propeller shaft 1 is measured again by the balance correcting machine (not shown) (step S5). And, a judgment is made as to whether or not this measured rotation balance is corrected to a specified imbalance value or lower (step S6). If the judgment is YES, the correction of the rotation imbalance is completed (step S7). If the judgment is NO, the routine returns to step S4, and the balance weight 3 equivalent to shortage of the rotation balance is added.

Finally, a surface of the shaft member 2 to which the balance weight 3 is welded, including the balance weight 3, is coated using e.g. a spray gun (not shown), then the propeller shaft 1 is completed. The above corresponds to a "process of coating the cylindrical body (or the tubular body)" according to the present invention.

Working and Effect of the Present Embodiment

Figure 20:
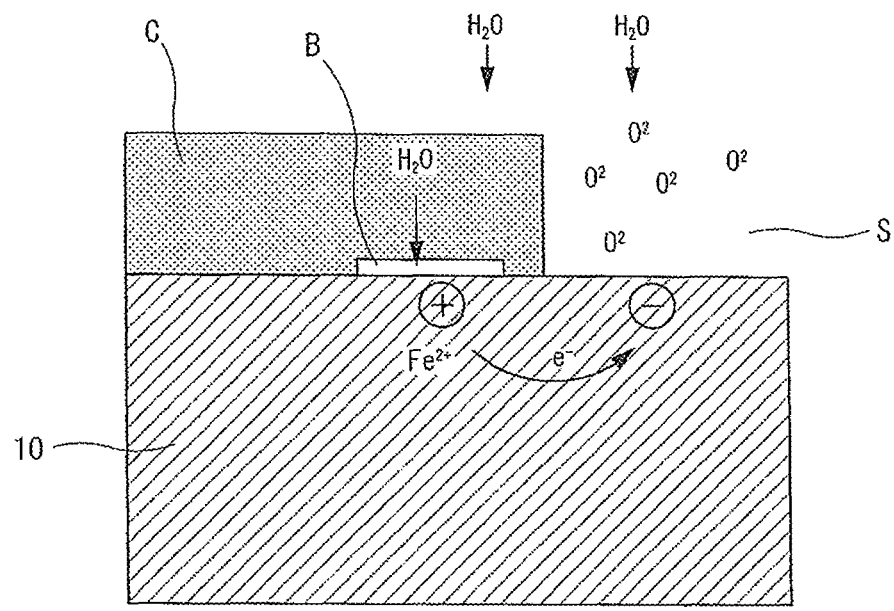
FIG. 20 is an enlarged view of a region A shown in FIG. 19.

FIG. 19 is a conceptual diagram showing a mechanism of progression of corrosion according to the related art propeller shaft. FIG. 20 is an enlarged view of a region A shown in FIG. 19.

Particularly, as shown in FIG. 19, although the related art propeller shaft is subjected to a rust prevention treatment by spraying or painting, there arises a problem of progression of local corrosion (occurrence of red rust) at a periphery of a balance weight 30. And, this corrosion does not proceed or develop in a gap S between an inner side surface 30c of the balance weight 30 and a surface of a steel pile 10 where a layer (a sprayed-layer or a painted-layer) C is not formed, but locally proceeds or develops at the periphery of the balance weight 30.

That is, as shown in FIG. 20, although the layer C is formed on an outer peripheral surface of the steel pile 10 around the periphery of the balance weight 30 by spraying or painting, not a little water ($H_2O$) permeates through the layer C, and also an oxygen concentration of an interface B between the layer C and the steel pile 10 is lower than that of the gap S between the inner side surface of the balance weight 30 and the outer peripheral surface of the steel pile 10. Because of this, the water ($H_2O$) permeating through the layer C collects or accumulates at the interface B between the layer C and the steel pile 10, and this forms so-called concentration cell (a differential aeration cell or a aeration cell or an oxygen cell) in which the interface B side becomes an anode (a positive electrode) and the gap S side becomes a cathode (a negative electrode) between the interface B and the gap S.

More specifically, iron ions ($Fe^{2+}$) are eluted at the interface B side by the water ($H_2O$) permeating through the layer C and adsorbed on the surface of the steel pile 10, and electrons ($e^-$) are released, then the interface B side is anodized ($Fe \rightarrow Fe^{2+}+2e^-$). Further, these eluted iron ions ($Fe^{2+}$) are oxidized by oxygen ($O_2$) contained in the water ($H_2O$), then iron hydroxide ($Fe(OH)_2$) is formed ($2Fe+O_2+2H_2O \rightarrow 2Fe(OH)_2$). Moreover, oxidation of this iron hydroxide ($Fe(OH)_2$) proceeds, and oxy-iron hydroxide (FeOOH) is formed at the interface B side ($2Fe(OH)_2+O_2 \rightarrow 2FeOOH$). Then, this oxy-iron hydroxide (FeOOH) is dehydrated, and red rust ($Fe_2O_3$) that is iron oxide is precipitated or deposited ($2FeOOH \rightarrow Fe_2O_3+2H_2O$).

Figure 21:
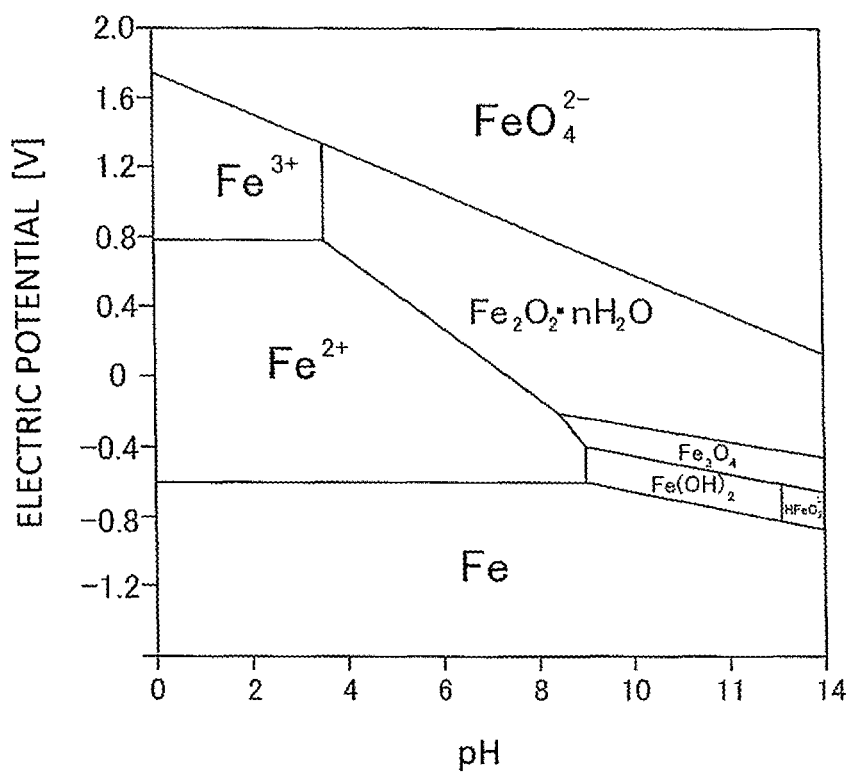
FIG. 21 is a drawing showing characteristics of pH-electric potential of iron.

On the other hand, regarding the gap S side opposite to the interface B, the oxy-iron hydroxide (FeOOH) formed at the interface B side flows to the gap S side and is bonded to the electron ($e^-$) released by the elution of the iron ion ($Fe^{2+}$), and the gap S side undergoes cathodic reduction, then black rust ($Fe_3O_4$) is formed ($FeOOH+2e^- \rightarrow 2Fe_3O_4+2H_2O+OH^-$). From characteristics of pH-electric potential shown in FIG. 21, pH becomes high by the black rust ($Fe_3O_4$), and this brings about the corrosion prevention effect. Further, corrosion at the gap S proceeds or develops and the gap S is covered with the black rust ($Fe_3O_4$), and thus a corrosion portion is fixed to the interface B side. As a result, the red rust ($Fe_2O_3$) at the interface B side locally proceeds or develops, and this corrosion deepens.

In this manner, in the case of the related art propeller shaft, since the corrosion by the red rust ($Fe_2O_3$) locally proceeds or develops, a torsional stress concentrates at the corrosion portion upon transmitting the power, and this loses durability of the propeller shaft.

FIG. 10 is a conceptual diagram showing a mechanism of progression of corrosion of the propeller shaft 1 according to the present embodiment.

As shown in FIG. 10, in the case of the propeller shaft 1 according to the present embodiment, the entire surface of the balance weight 3 is covered with the sacrificial metal coating 4 made of the sacrificial metal material (in the present embodiment, zinc) that contains metal whose ionization tendency is higher than that of metal (iron-based metal) forming the shaft member 2.

With this, by the water ($H_2O$) passing or permeating through the layer C and adsorbed on the surface of the balance weight 3, in advance of the iron-based metal forming the shaft member 2, zinc ions ($Zn^{2+}$) forming the sacrificial metal coating 4 whose ionization tendency is higher than that of the iron-based metal are eluted, and electrons ($e^-$) are released ($Zn \rightarrow Zn^{2+}+2e^-$). Then, the electrons ($e^-$) released from the zinc flow from the balance weight 3 side to the shaft member 2 side, and thus the balance weight 3 side becomes an anode (a positive electrode), and the shaft member 2 side becomes a cathode (a negative electrode). That is, current flowing from the balance weight 3 side toward the shaft member 2 side is generated. With this, ionization of the iron-based metal is not promoted at the shaft member 2 side around a periphery of the balance weight 3, and this reduces a tendency for the red rust ($Fe_2O_3$) to occur.

On the other hand, at the gap S side, the eluted zinc ions ($Zn^{2+}$) are oxidized by the oxygen ($O_2$) contained in the water ($H_2O$), then white rust ($ZnO+Zn(OH)_2$) is formed at the sacrificial metal coating 4 made of the zinc ($2Zn+O_2+2H_2O \rightarrow ZnO+Zn(OH)_2$). Since this white rust ($ZnO+Zn(OH)_2$) is a dense thin layer, the white rust ($ZnO+Zn(OH)_2$) acts as a protection layer, then progression of the corrosion of the sacrificial metal coating 4 at the balance weight 3 side is suppressed.

In this manner, the propeller shaft 1 according to the present embodiment brings about the sacrificial corrosion prevention effect by the fact that in advance of the iron-based metal (Fe) forming the shaft member 2, the zinc (Zn) forming the sacrificial metal coating 4 is eluted, then the current is generated from the balance weight 3 side toward the shaft member 2 side. It is therefore possible to suppress the progression of the local corrosion (red rust ($Fe_2O_3$)) of the shaft member 2 at the periphery of the balance weight 3, thereby improving durability of the propeller shaft 1.

As described above, the propeller shaft 1 according to the present embodiment can solve the problem of the related art propeller shaft by the specific effect based on the following structures or configurations.

A propeller shaft 1 comprises: a shaft member 2 that is a tubular body made of iron-based metal; and a balance weight 3 made of iron-based metal and welded to an outer peripheral surface of the shaft member 2. And, at least a part of the balance weight 3 is covered with sacrificial metal coating 4 made of sacrificial metal material (in the present embodiment, zinc) that contains metal whose ionization tendency is higher than that of metal forming the shaft member 2.

As described above, in the present embodiment, at least a part of a surface of the balance weight 3 is covered with the sacrificial metal coating 4 made of the sacrificial metal material that contains metal whose ionization tendency is higher than that of the iron-based metal forming the shaft member 2. Because of this, the sacrificial metal coating 4 of the balance weight 3 corrodes in advance of the shaft member 2, and the shaft member 2 side at the periphery of the balance weight 3 undergoes cathodic reduction. With this, the local corrosion of the shaft member 2 at the periphery of the balance weight 3 can be suppressed. This consequently reduces a tendency for the shaft member 2 to become thinner due to the local progression of the corrosion. It is thus possible to suppress the concentration of the dynamic torsional stress upon transmitting the power, thereby improving long-term durability (especially, torsion-resistant fatigue properties) of the propeller shaft 1.

In the present embodiment, the balance weight 3 is formed into a plate member, and a surface of the balance weight 3 is covered with the sacrificial corrosion prevention material (the sacrificial metal coating 4).

Since the surface of the balance weight 3 is covered, zinc as the sacrificial corrosion prevention material tends to be eluted in advance of the iron-based metal, then by the sacrificial corrosion prevention effect, durability of the propeller shaft 1 can be effectively improved.

In the present embodiment, at least a surface, at a tubular body side, of the balance weight 3 or a surface, at an opposite side to the shaft member 2 (the tubular body), of the balance weight 3 is covered with the sacrificial corrosion prevention material (the sacrificial metal coating 4).

Since a relatively large surface area of the balance weight 3 is covered with the sacrificial corrosion prevention material (the sacrificial metal coating 4), the sacrificial corrosion prevention effect can last for a long time, thereby improving long-term durability of the propeller shaft 1.

Preferably, the sacrificial corrosion prevention material is made of zinc, magnesium, aluminum or an alloy containing at least one of these metals. The sacrificial corrosion prevention material according to the present embodiment is made of zinc.

Since the sacrificial corrosion prevention material is made of zinc, magnesium, aluminum or the alloy containing at least one of these metals which are metals whose ionization tendency is relatively higher than that of iron, a relatively strong sacrificial corrosion prevention effect can be obtained. Further, as a merit, these metals are easily treated.

Further, in the present embodiment, a method of manufacturing a power transmission shaft, the power transmission shaft having a shaft member 2 that is a tubular body made of iron-based metal and a balance weight 3 made of iron-based metal and fixed to an outer peripheral surface of the shaft member 2, comprises: a process of preparing a plurality of balance weights, weights of which are different from each other and at least parts of which are each covered with sacrificial corrosion prevention material (the sacrificial metal coating 4) that contains metal whose ionization tendency is higher than that of metal forming the shaft member 2; a process of determining a fixing position to the shaft member 2 and weight of the balance weight 3 according to a rotation imbalance of a propeller shaft 1 as the power transmission shaft; a process of welding the determined balance weight 3 to the shaft member 2; and a process of coating the shaft member 2 including the balance weight 3.

As described above, in the present embodiment, at least a part of a surface of the balance weight 3 is covered with the sacrificial metal coating 4 made of the sacrificial metal material that contains metal whose ionization tendency is higher than that of the iron-based metal forming the shaft member 2. Therefore, the sacrificial metal coating 4 of the balance weight 3 corrodes in advance of the shaft member 2, and the shaft member 2 side at the periphery of the balance weight 3 undergoes cathodic reduction. With this, the local corrosion of the shaft member 2 at the periphery of the balance weight 3 can be suppressed. This consequently reduces a tendency for the shaft member 2 to become thinner due to the local progression of the corrosion. It is thus possible to suppress the concentration of the dynamic torsional stress upon transmitting the power, thereby improving long-term durability (especially, torsion-resistant fatigue properties) of the propeller shaft 1.

In the present embodiment, the balance weight 3 is formed into a plate member, and a welding surface between the balance weight 3 and the shaft member 2 is covered with the sacrificial corrosion prevention material.

Since the welding surface that faces to the gap S where the water tends to collect or accumulate is covered with the sacrificial corrosion prevention material, the sacrificial corrosion prevention material tends to be eluted by the water accumulating in the gap S, and thus a stronger sacrificial corrosion prevention effect can be obtained.

In the present embodiment, the balance weight 3 is curved at a curvature corresponding to a curvature of the outer peripheral surface of the shaft member 2, and a projecting portion 3a that is a welding projection is formed on a contact surface of the balance weight 3 with the shaft member 2.

With this structure or configuration, the balance weight 3 can be fixed to the shaft member 2 easily and firmly. Further, in the case where the welding surface is covered with the sacrificial corrosion prevention material, by providing the projecting portion 3a on the welding surface, the projecting portion 3a that is a welding point is in point contact with the shaft member 2, then influence on the sacrificial corrosion prevention material upon performing the welding (applying current) can be reduced.

In the present embodiment, the balance weight 3 is formed by stamping out a band-shaped material that is plated with the sacrificial corrosion prevention material (the sacrificial metal coating 4).

By molding the balance weight 3 by stamping out the so-called plating steel plate (or the plating steel sheet) on which the sacrificial metal coating 4 is previously provided, productivity is increased, thereby reducing manufacturing cost of the propeller shaft 1.

Here, in the present embodiment, as a manner of coating the balance weight 3 with the sacrificial corrosion prevention material, an example in which the plating steel plate is stamped out is explained. However, the manner of coating the balance weight 3 with the sacrificial corrosion prevention material is not limited to the above example.

As the manner of coating the balance weight 3 with the sacrificial corrosion prevention material, for instance, after press-molding (stamping out) the steel sheet that is a coil-like wound band-shaped material, a stamped material is covered with the sacrificial corrosion prevention material.

That is, the balance weight 3 is formed by, after stamping out the band-shaped material, coating the stamped material with the sacrificial corrosion prevention material.

In this case, since it is possible to freely set a thickness of the sacrificial corrosion prevention material (the sacrificial metal coating 4), a stronger sacrificial corrosion prevention effect can be obtained. Further, as a merit, the sacrificial corrosion prevention material (the sacrificial metal coating 4) is easily treated.

In the present embodiment, an entire surface of the balance weight 3 is covered with the sacrificial corrosion prevention material (the sacrificial metal coating 4).

Since the entire surface of the balance weight 3 is covered with the sacrificial metal coating 4, a stronger sacrificial corrosion prevention effect can be obtained, and also the sacrificial corrosion prevention effect can last for a long time.

Modified Example

In the above first embodiment, as a specific method of welding the balance weight 3, the example in which a well-known projection welding is employed is explained. However, as the welding method, it is not limited to the projection welding. In other words, any welding method that can obtain the working and effect of the present invent ion can be employed. As an example of other methods, a method of fixing a balance weight 31 to the shaft member 2 by spot welding will be explained below.

Figure 12:
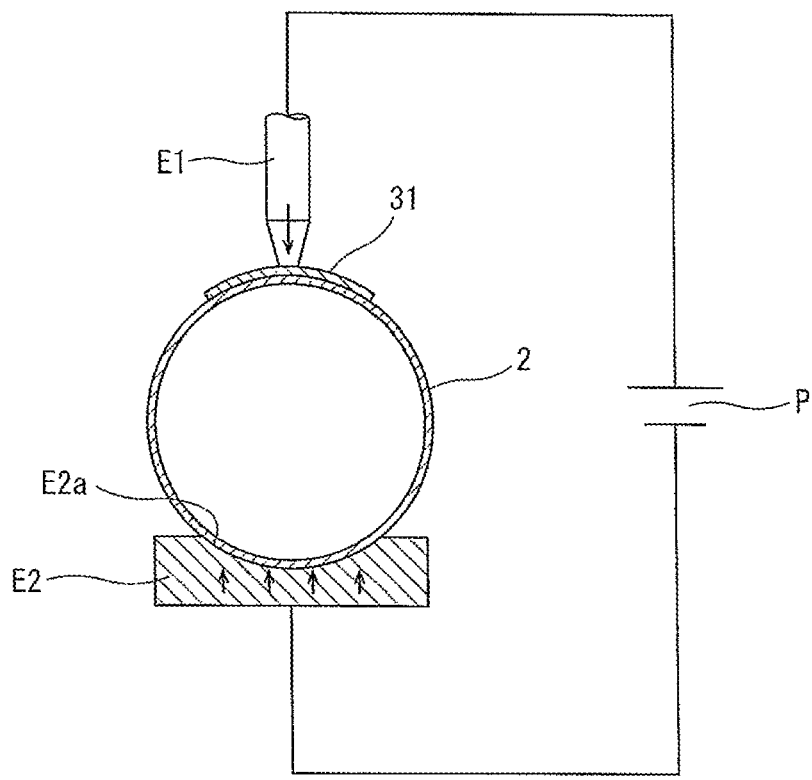
FIG. 12 is a schematic view of a spot welding device of the balance weight.

FIGS. 11A and 11B and FIG. 12 show a modified example of the first embodiment of the present invention. In the modified example, the balance weight 31 is fixed to the shaft member 2 by spot welding. Other structures or configurations of the modified example are the same as those of the first embodiment. Therefore, the same element or component as that of the first embodiment is denoted by the same reference sign, and its explanation will be omitted.

(Structure of Balance Weight)

FIGS. 11A and 11B show a structure of the balance weight 31 that is going to be spot-welded. FIG. 11A is a perspective view. FIG. 11B is a side view.

As shown in FIGS. 11A and 11B, the balance weight 31 is a substantially rectangular-shaped plate member having a substantially even thickness (a substantially even plate thickness) and extending in the circumferential direction of the shaft member 2 so as to be a rectangle viewed from above. Further, the balance weight 31 is formed so as to be curved in the circumferential direction with a curvature corresponding to the curvature of the outer peripheral surface of the shaft member 2. In other words, the balance weight 31 of the modified example is a balance weight having no projecting portion 3a of the balance weight 3 of the first embodiment.

(Method of Manufacturing Propeller Shaft)

FIG. 12 is a schematic view of a spot welding device for welding the balance weight 31.

Also in the modified example, in the same manner as the first embodiment, the balance weight 31 is fixed to the outer peripheral surface of the shaft member 2 along the flow chart shown in FIG. 9.

Especially in a welding process of the balance weight 31, in a spot welding device as shown in FIG. 12, on the basis of the measurement result at step S3 in FIG. 9, the shaft member 2 is mounted on an upper side recessed portion E2a of a lower electrode E2 as a fixed electrode so that a fixing position of the balance weight 31 faces an upper electrode E1. Then, the balance weight 31 is placed at the predetermined fixing position determined based on the measurement result on an upper side of the shaft member 2 supported by the lower electrode E2. Subsequently, by moving down the upper electrode E1 and applying power to the balance weight 31 and the shaft member 2 by current from a power supply P with an inner side surface 31c of the balance weight 31 being pressed against the outer peripheral surface of the shaft member 2, the balance weight 31 is welded to the outer peripheral surface of the shaft member 2.

Working and Effect of the Modified Example

The above modified example can also obtain substantially the same working and effect as those of the first embodiment. In particular, by employing the spot welding, it is possible to fix the balance weight 31 more easily. This can reduce a manufacturing cost of the propeller shaft 1.

Second Embodiment

FIGS. 13A and 13B and FIGS. 14A to 14C show a second embodiment of the power transmission shaft and its manufacturing method of the present invention. In the present embodiment, a balance weight 32 is fixed to the shaft member 2 with a rivet. Other structures or configurations of the second embodiment are the same as those of the first embodiment. Therefore, the same element or component as that of the first embodiment is denoted by the same reference sign, and its explanation will be omitted.

(Structure of Balance Weight)

Figure 13A:
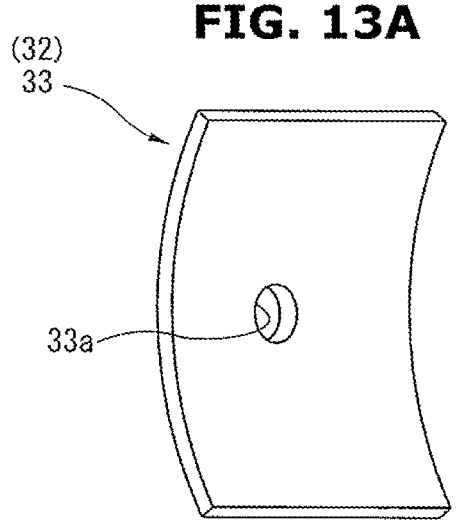
FIGS. 13A and 13B are rivet fixing type balance weights according to a second embodiment of the present invention.
Figure 13B:
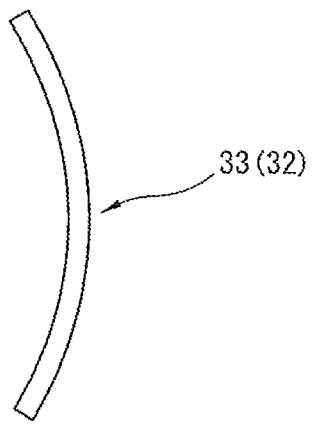

FIGS. 13A and 13B show a structure of the balance weight 32. FIG. 13A is a perspective view. FIG. 13B is a side view.

As shown in FIGS. 13A and 13B and FIGS. 14A to 14C, the balance weight 32 has a weight body 33 as a weight made of iron-based material and a rivet 34 as a fixing member to fix the weight body 33 to the shaft member 2.

The weight body 33 is a substantially rectangular-shaped plate member having a substantially even thickness (a substantially even plate thickness) and extending in the circumferential direction of the shaft member 2 so as to be a rectangle viewed from above. Further, a penetration hole 33a which the rivet 34 (an after-mentioned rivet body 34a) penetrates is formed at a substantially middle position, viewed from above, of the weight body 33.

The rivet 34 is formed into a substantially cylindrical column. The rivet 34 has the rivet body 34a that penetrates the penetration hole 33a of the weight body 33 and a flange portion 34b that is formed at one end portion of the rivet body 34a so that its diameter is widened and that is welded to the outer peripheral surface of the shaft member 2. That is, the rivet 34 is welded to the outer peripheral surface of the shaft member 2 through the flange portion 34b, then, by riveting the rivet body 34a, the balance weight 32 is fixed to the shaft member 2.

(Manufacturing Method of Propeller Shaft)

Figure 14A:
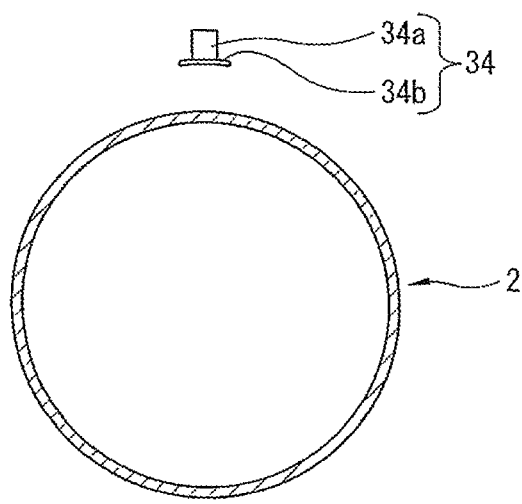
FIGS. 14A to 14C show fixing procedures of the balance weight shown in FIGS. 13A and 13B.
Figure 14B:
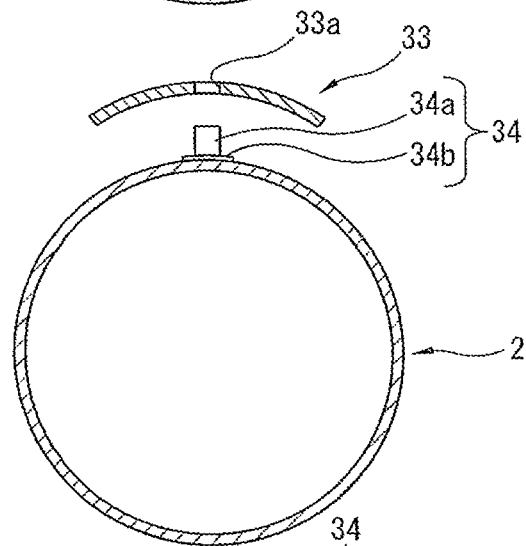
Figure 14C:
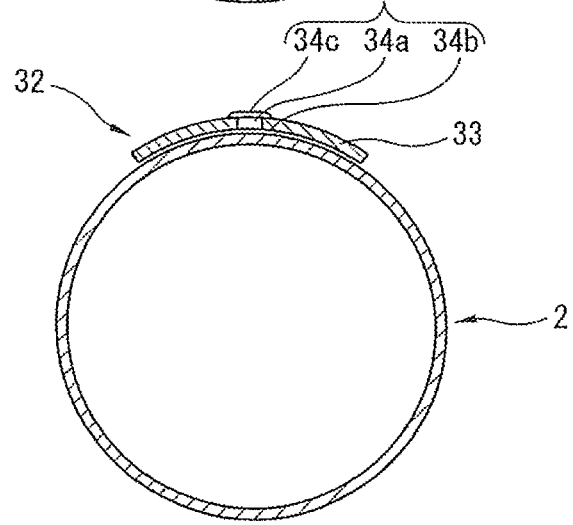

FIGS. 14A to 14C show a manufacturing method of the propeller shaft 1, especially a fixing method of the balance weight 32, as sectional views of the propeller shaft (the shaft member 2). FIG. 14A shows a process of welding the rivet 34. FIG. 14B shows a process of inserting the weight body 33 onto the rivet 34. FIG. 14C shows a process of riveting the rivet 34.

Also in the present embodiment, in the same manner as the first embodiment, the balance weight 32 is fixed to the outer peripheral surface of the shaft member 2 along the flow chart shown in FIG. 9.

Especially in a welding process of the balance weight 32, as shown in FIG. 14A, the rivet 34 is welded to the fixing position determined based on the measurement result at step S3 in FIG. 9 on the outer peripheral surface of the shaft member 2 through the flange portion 34b. Subsequently, as shown in FIG. 14B, the weight body 33 having a weight that is determined on the basis of the measurement result is inserted, from the other end side of the rivet body 34a, onto the rivet body 34a of the rivet 34 welded to the outer peripheral surface of the shaft member 2. Then, as shown in FIG. 14C, by squashing the other end portion of the rivet body 34a penetrating the penetration hole 33a of the weight body 33 (by a riveting process of the rivet body 34a), a riveted portion 34c is formed. With this, the weight body 33 is sandwiched and secured between the riveted portion 34c and the flange portion 34b, then the weight body 33 is fixed to the shaft member 2 through the rivet 34.

Working and Effect of the Present Embodiment

As described above, the balance weight 32 of the propeller shaft 1 according to the present embodiment has the rivet 34 made of iron-based metal and the weight body 33 as the weight made of iron-based metal and provided with the penetration hole 33a which the rivet 34 penetrates. And, at least one of the rivet 34 and the weight body 33 is coated with the sacrificial corrosion prevention material.

More specifically, the balance weight 32 has the rivet 34 made of iron-based metal and the weight body 33 as the weight made of iron-based metal and provided with the penetration hole which the rivet 34 penetrates, and at least one of the rivet 34 and the weight body 33 is coated with the sacrificial corrosion prevention material, and the rivet 34 is welded, then the weight body 33 is fixed to the shaft member 2 that is the cylindrical body (or the tubular body).

As described above, also by the balance weight 32 fixed to the shaft member 2 through the rivet 34, the same sacrificial corrosion prevention effect as that of the first embodiment can be obtained, thereby improving durability of the propeller shaft 1.

Further, in the case of the present embodiment, since the balance weight 32 is not directly welded to the shaft member 2, but fixed to the shaft member 2 through the rivet 34, thermal influence such as thermal distortion on the balance weight 32 can be suppressed.

In addition, since the rivet 34 is welded to the shaft member 2 through the flange portion 34b that is relatively thin as compared with the balance weight 32, the rivet 34 can be easily fixed to the shaft member 2. Further, regarding the balance weight 32, the balance weight 32 is fixed to the shaft member 2 by riveting the rivet 34. Therefore, as compared with the case where the balance weight 32 is directly welded to the shaft member 2, the balance weight 32 can be fixed to the shaft member 2 easily and firmly.

In the present embodiment in which the weight body 33 is fixed using the rivet 34, at least one of the weight body 33 and the rivet 34 is coated with the sacrificial corrosion prevention material. In other words, also by coating the rivet 34 with the sacrificial corrosion prevention material, by the sacrificial corrosion prevention effect, progression of the local corrosion of the shaft member 2 at the periphery of the balance weight 32 can be suppressed.

Third Embodiment

Figure 15:
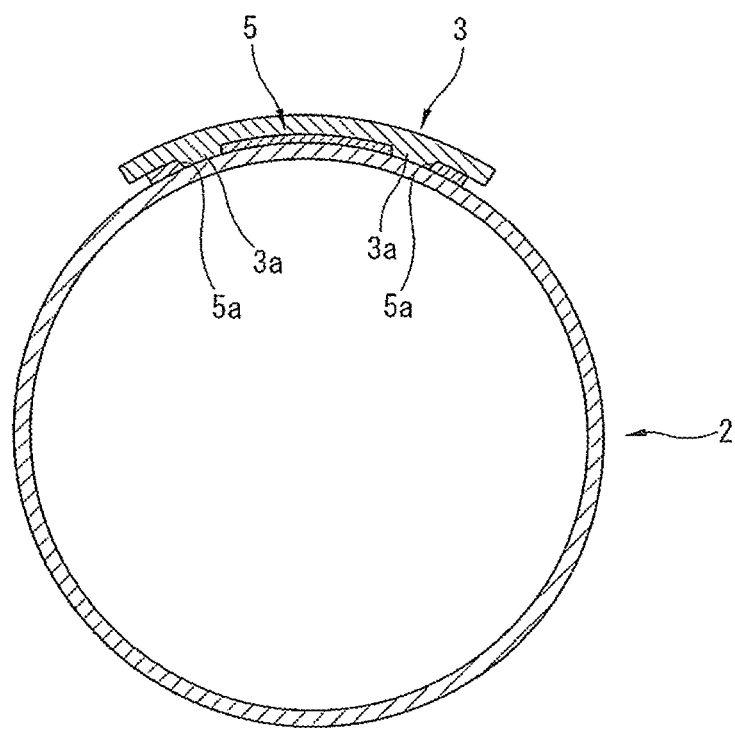
FIG. 15 is a sectional view of the propeller shaft according to a third embodiment of the present invention.

FIG. 15 shows a third embodiment of the power transmission shaft and its manufacturing method of the present invention. In the present embodiment, an after-described sacrificial metal 5 is directly provided at a part of the balance weight 3. Other structures or configurations of the third embodiment are the same as those of the first embodiment. Therefore, the same element or component as that of the first embodiment is denoted by the same reference sign, and its explanation will be omitted.

(Structure of Balance Weight)

FIG. 15 is a sectional view of the propeller shaft 1 with the balance weight 3 and the sacrificial metal 5 being fixed.

As shown in FIG. 15, in the present embodiment, the sacrificial metal 5 whose ionization tendency is higher than that of metal (iron-based metal) forming the shaft member 2 is provided at a part of the inner side surface 3c that is a surface of the balance weight 3 so as to contact this part of the inner side surface 3c.

The balance weight 3 is projection-welded to the shaft member 2 through the two projecting portions 3a that are separate from each other in a longitudinal direction (in the circumferential direction of the shaft member 2).

The sacrificial metal 5 is a plate member made of metal, e.g. zinc, whose ionization tendency is higher than that of metal (iron-based metal) forming the shaft member 2. That is, the sacrificial metal 5 is a substantially rectangular-shaped plate member having a substantially even thickness (a substantially even plate thickness) and extending in the circumferential direction of the shaft member 2 so as to be a rectangle viewed from above. Further, the sacrificial metal 5 is formed so as to be curved in the circumferential direction with a curvature corresponding to the curvature of the outer peripheral surface of the shaft member 2.

Furthermore, the sacrificial metal 5 is provided, at positions corresponding to the projecting portions 3a of the balance weight 3, with two engaging holes 5a into which the projecting portions 3a are fitted or inserted. That is, positioning of the sacrificial metal 5 is made by engagement of the projecting portions 3a of the balance weight 3 and the engaging holes 5a. Then, by welding the balance weight 3 to the shaft member 2, the sacrificial metal 5 is fixed with the sacrificial metal 5 sandwiched and secured between the balance weight 3 and the shaft member 2.

Here, when welding the balance weight 3 to the shaft member 2, first, the projecting portions 3a are fitted or inserted into the engaging holes 5a of the sacrificial metal 5, and a position of the sacrificial metal 5 is fixed at an inner side of the balance weight 3. Then, in this positioning state of the sacrificial metal 5, the balance weight 3 and the sacrificial metal 5, which are combined together, are projection-welded to the shaft member 2 through the projecting portions 3a.

Working and Effect of the Present Embodiment

A propeller shaft 1 according to the present embodiment comprises: a shaft member 2 that is a tubular body made of iron-based metal; and a balance weight 3 made of iron-based metal and welded to an outer peripheral surface of the shaft member 2. And, at least a part of the balance weight 3 is provided with a sacrificial metal (in the present embodiment, zinc) whose ionization tendency is higher than that of metal forming the shaft member 2.

As described above, in the present embodiment, at least a part of a surface of the balance weight 3 is provided with the sacrificial metal 5 that contains metal whose ionization tendency is higher than that of the iron-based metal forming the shaft member 2. Because of this, the sacrificial metal 5 corrodes in advance of the shaft member 2, and in the same manner as the first embodiment, the shaft member 2 side at the periphery of the balance weight 3 undergoes cathodic reduction. With this, the local corrosion of the shaft member 2 at the periphery of the balance weight 3 can be suppressed. This consequently reduces a tendency for the shaft member 2 to become thinner due to the local progression of the corrosion. It is thus possible to suppress the concentration of the dynamic torsional stress upon transmitting the power, thereby improving long-term durability (especially, torsion-resistant fatigue properties) of the propeller shaft 1.

In the present embodiment, the balance weight 3 is formed into a plate member, and the sacrificial metal 5 is provided on a surface of the balance weight 3 so as to contact the surface of the balance weight 3.

Since the sacrificial metal 5 is provided on the surface of the balance weight 3 so as to contact the surface of the balance weight 3, the sacrificial metal 5 (zinc) tends to be eluted in advance of the iron-based metal, then by the sacrificial corrosion prevention effect, durability of the propeller shaft 1 can be effectively improved.

In the present embodiment, the balance weight 3, which is the plate member, has a projecting portion 3*a*, and positioning of the sacrificial metal 5 is made by the projecting portion 3*a*.

Since positioning of the sacrificial metal 5 is made by the projecting portion 3*a* of the balance weight 3, fixing workability of the sacrificial metal 5 is improved, thereby reducing manufacturing cost of the propeller shaft 1.

In the present embodiment, the sacrificial metal 5 is provided between the shaft member 2 and the balance weight 3.

Since the sacrificial metal 5 is placed at a position between the shaft member 2 and the balance weight 3 where an oxygen concentration tends to lower, ionization of the sacrificial metal 5 is promoted, and this can effectively bring about the sacrificial corrosion prevention effect.

Further, since the sacrificial metal 5 is provided between the shaft member 2 and the balance weight 3, a relatively large surface area of the balance weight 3 is covered with the sacrificial metal 5. Therefore, the sacrificial corrosion prevention effect can last for a long time, thereby improving long-term durability of the propeller shaft 1.

Furthermore, since the sacrificial metal 5 is provided at a position closer to the shaft member 2 between the shaft member 2 and the balance weight 3, electrons released by elution of the sacrificial metal 5 tend to move to the shaft member 2 side, and this can effectively bring about the sacrificial corrosion prevention effect.

Preferably, the sacrificial metal 5 is made of zinc, magnesium, aluminum or an alloy containing at least one of these metals. The sacrificial metal 5 according to the present embodiment is made of zinc.

Since the sacrificial metal 5 is made of zinc, magnesium, aluminum or the alloy containing at least one of these metals which are metals whose ionization tendency is relatively higher than that of iron, a relatively strong sacrificial corrosion prevention effect can be obtained. Further, as a merit, these metals are easily treated.

Modified Example

FIGS. 16A and 16B and FIGS. 17A to 17D show modified examples. In the modified examples, the balance weight 32 and the sacrificial metal 5 are fixed to the shaft member 2 with the rivet 34. Other structures or configurations of the modified examples are the same as those of the first embodiment. Therefore, the same element or component as that of the first embodiment is denoted by the same reference sign, and its explanation will be omitted.

Figure 16A:
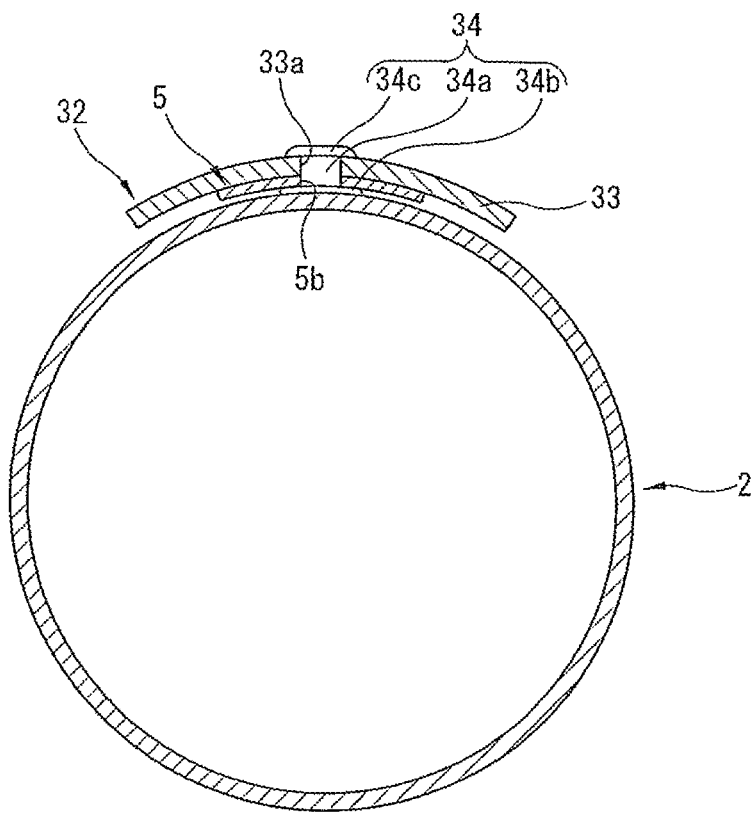
FIGS. 16A and 16B show sectional views of modified examples of the propeller shaft of the third embodiment of the present invention.

FIG. 16A shows a sectional view of the propeller shaft 1 with the sacrificial metal 5 being provided at the inner side surface 3*c* of the balance weight 32 so as to contact the inner side surface 3*c*. On the other hand, FIG. 16B shows a sectional view of the propeller shaft 1 with the sacrificial metal 5 being provided at the outer side surface 3*b* of the balance weight 32 so as to contact the outer side surface 3*b*.

As shown in FIG. 16A, in the modified example, the two projecting portions 3*a* of the third embodiment are removed, and in the same manner as the second embodiment, the weight body 33 having, at the substantially middle position, viewed from above, thereof, the penetration hole 33*a* is fixed to the shaft member 2 through the rivet 34. The rivet 34 is welded to the shaft member 2 through the flange portion 34*b*, which is the same as the second embodiment.

Further, in the modified example, the two engaging holes 5*a* of the third embodiment are removed. Instead, a penetration hole 5*b* which the rivet 34 (the rivet body 34*a*) penetrates is formed at a substantially middle position, viewed from above, of the sacrificial metal 5. That is, the sacrificial metal 5 of the modified example is placed at the inner side of the weight body 33 of the balance weight 32, and fixed to the shaft member 2 together with the weight body 33 by the rivet 34 penetrating the penetration hole 5*b*.

Figure 16B:
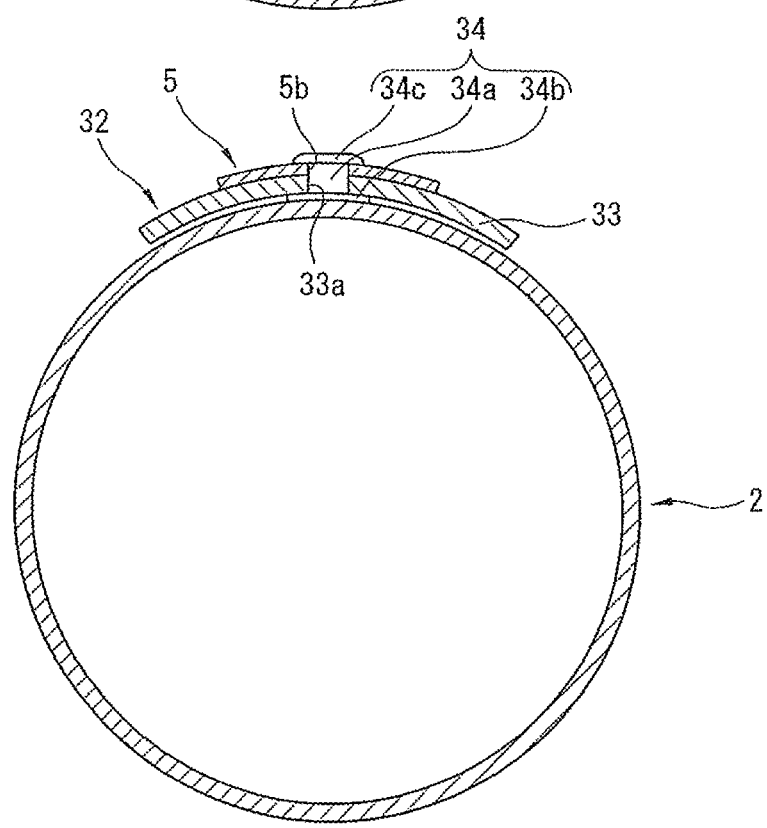

Here, as shown in FIG. 16B, the sacrificial metal 5 could be placed at the outer side of the weight body 33 of the balance weight 32, and fixed with the rivet 34 by riveting.

(Manufacturing Method of Propeller Shaft)

Figure 17A:
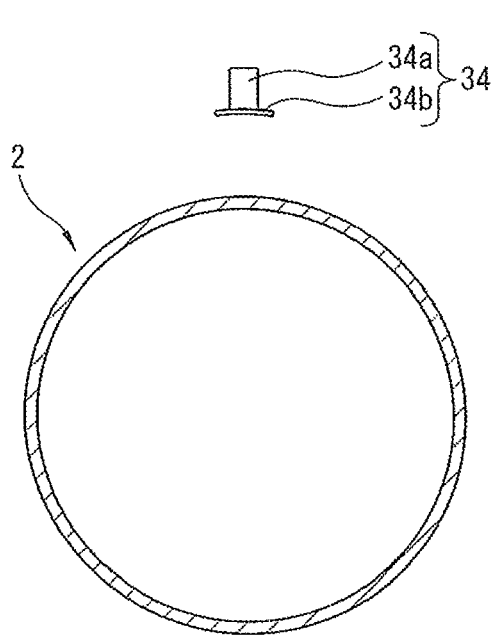
FIGS. 17A to 17D show fixing procedures of the balance weight and the sacrificial metal shown in FIG. 16A.
Figure 17B:
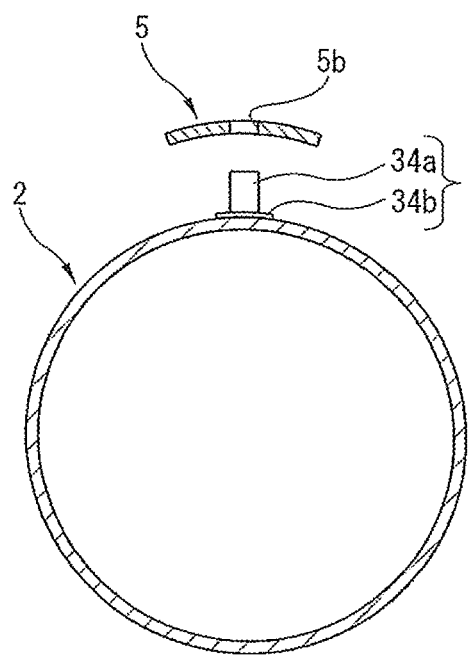
Figure 17C:
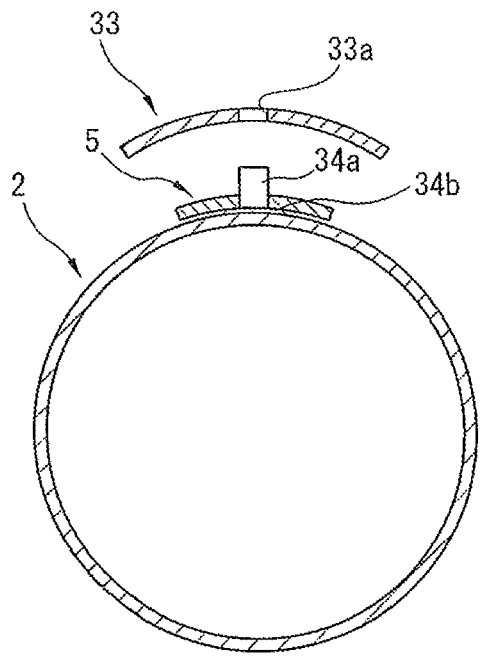
Figure 17D:
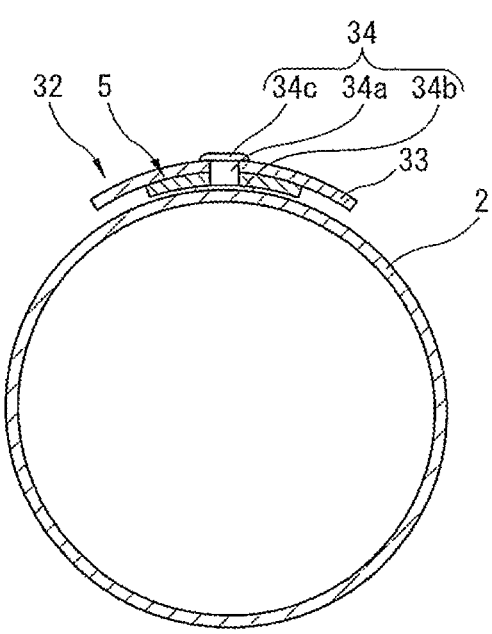

FIGS. 17A to 17D show a manufacturing method of the propeller shaft 1, especially a fixing method of the balance weight 32 and the sacrificial metal 5, as sectional views of the propeller shaft (the shaft member 2). FIG. 17A shows a process of welding the rivet 34. FIG. 17B shows a process of inserting the sacrificial metal 5 onto the rivet 34. FIG. 17C shows a process of inserting the weight body 33 onto the rivet 34. FIG. 17D shows a process of riveting the rivet 34.

Also in the present embodiment, in the same manner as the first embodiment, the balance weight 32 is fixed to the outer peripheral surface of the shaft member 2 along the flow chart shown in FIG. 9.

Especially in a welding process of the balance weight 32, as shown in FIG. 17A, the rivet 34 is welded to the fixing position determined based on the measurement result at step S3 in FIG. 9 on the outer peripheral surface of the shaft member 2 through the flange portion 34*b*. Subsequently, as shown in FIG. 17B, the sacrificial metal 5 is inserted, from the other end side of the rivet body 34*a*, onto the rivet body 34*a* of the rivet 34 welded to the outer peripheral surface of the shaft member 2. Further, as shown in FIG. 17C, the weight body 33 having a weight that is determined on the basis of the measurement result is inserted, from the other end side of the rivet body 34*a*, onto the rivet body 34*a* of the rivet 34 so as to be stacked on or overlap the sacrificial metal 5. Then, as shown in FIG. 17D, by squashing the other end portion of the rivet body 34*a* penetrating the penetration hole 33*a* of the weight body 33 and the penetration hole 5*b* of the sacrificial metal 5 (by a riveting process of the rivet body 34*a*), a riveted portion 34*c* is formed. With this, the sacrificial metal 5 and the weight body 33 are sandwiched and secured between the flange portion 34*b* and the riveted portion 34*c*, then the sacrificial metal 5 and the weight body 33 are fixed to the shaft member 2 together through the rivet 34.

Working and Effect of the Modified Examples

The balance weight 32 of the propeller shaft 1 according to the modified example has a rivet 34 made of iron-based metal; and a weight body 33 as a weight made of iron-based metal and having a penetration hole 33*a* into which the rivet 34 is inserted. And, the sacrificial metal 5 has a penetration hole 5*b* into which the rivet 34 is inserted. Further, the balance weight 32 and the sacrificial metal 5 are fixed to the shaft member 2 that is a tubular body through the rivet 34.

In the modified example, the sacrificial metal 5 is fixed to the shaft member 2 together with the weight body 33 of the balance weight 32 through the rivet 34. It is therefore possible to fix the sacrificial metal 5 and the weight body 33 to the shaft member 2 easily and firmly while suppressing thermal influence of the welding on the sacrificial metal 5 and the weight body 33.

In the modified example, the sacrificial metal 5 is provided between the weight body 33 of the balance weight 32 and the rivet 34.

Since the sacrificial metal 5 is provided between the weight body 33 forming the balance weight 32 and the rivet 34, the sacrificial metal 5 can be fixed to the shaft member 2 together with the weight body 33 by the rivet 34. It is thus possible to readily fix the sacrificial metal 5, thereby reducing manufacturing cost of the propeller shaft 1.

Reference Example

Figure 18:
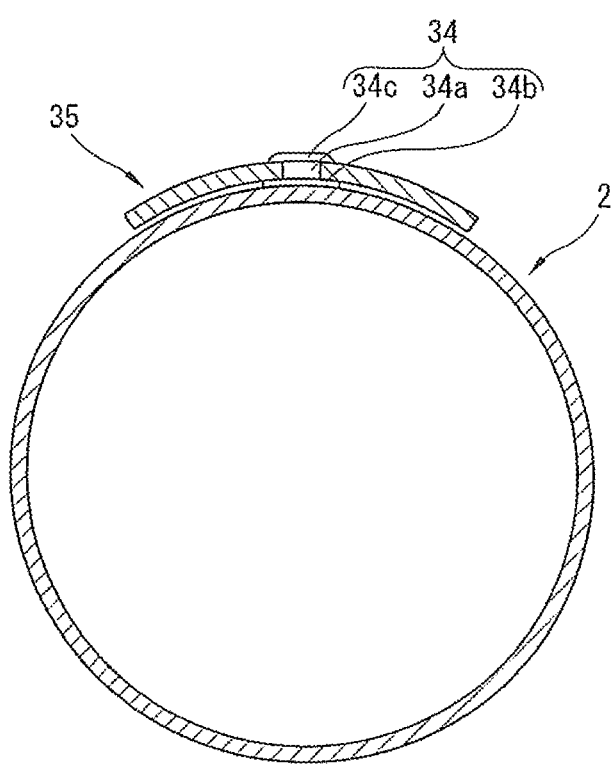
FIG. 18 is a sectional view of the propeller shaft of a reference example of the present invention.

FIG. 18 shows a reference example of the power transmission shaft according the present invention. In the reference example, a balance weight 35 itself is formed by the sacrificial metal 5. Other structures or configurations of the modified examples are the same as those of the second embodiment. Therefore, the same element or component as that of the second embodiment is denoted by the same reference sign, and its explanation will be omitted.

(Structure of Balance Weight)

FIG. 18 is a sectional view of the propeller shaft 1 with the balance weight 35 being fixed.

As shown in FIG. 18, in the reference example, the balance weight 35 is made of sacrificial metal material that contains metal whose ionization tendency is higher than that of metal (in the reference example, iron-based metal) forming the shaft member 2. Here, as the sacrificial metal material, for instance, it is zinc, magnesium, aluminum and an alloy containing at least one of these metals. In the reference example, zinc is used.

Working and Effect of the Reference Example

Also by forming the balance weight 35 itself with the sacrificial corrosion prevention material as described in the reference example, the same sacrificial corrosion prevention effect as that of the second embodiment can be obtained, thereby improving durability of the propeller shaft 1.

The present invention is not limited to the structures or configurations described in the above embodiments and examples. For instance, regarding shape of the balance weight 3 etc. and shape and arrangement or position (arranging area) of the sacrificial metal coating 4 and the sacrificial metal 5, as long as the working and effect of the present invention can be obtained, these shapes etc. can be changed freely according to specifications and cost and so on.

As the power transmission shaft based on the embodiments and examples explained above, for instance, the followings are raised.

As one aspect of the present invention, a power transmission shaft comprises: a tubular body made of iron-based metal; and a balance weight made of iron-based metal and welded to an outer peripheral surface of the tubular body. And, at least a part of the balance weight is covered with sacrificial corrosion prevention material that contains metal whose ionization tendency is higher than that of metal forming the tubular body.

As a preferable power transmission shaft, the balance weight is formed into a plate member, and a surface of the balance weight is covered with the sacrificial corrosion prevention material.

As a far preferable power transmission shaft, at least a surface, at a tubular body side, of the balance weight or a surface, at an opposite side to the tubular body, of the balance weight is covered with the sacrificial corrosion prevention material.

As a far preferable power transmission shaft, the sacrificial corrosion prevention material is made of zinc, magnesium, aluminum or an alloy containing at least one of these metals.

As a far preferable power transmission shaft, the balance weight has a rivet made of iron-based metal; and a weight body made of iron-based metal and having a penetration hole into which the rivet is inserted. And, at least one of the rivet and the weight body is covered with the sacrificial corrosion prevention material.

From other viewpoint, a power transmission shaft comprises: a tubular body made of iron-based metal; and a balance weight made of iron-based metal and welded to an outer peripheral surface of the tubular body. And, at least a part of the balance weight is provided with a sacrificial metal whose ionization tendency is higher than that of metal forming the tubular body.

As a preferable power transmission shaft, the balance weight is formed into a plate member, and the sacrificial metal is provided on a surface of the balance weight so as to contact the surface of the balance weight.

As a far preferable power transmission shaft, the plate member has a projecting portion, and positioning of the sacrificial metal is made by the projecting portion.

As a far preferable power transmission shaft, the sacrificial metal is provided between the tubular body and the balance weight.

As a far preferable power transmission shaft, the sacrificial metal is made of zinc, magnesium, aluminum or an alloy containing at least one of these metals.

As a far preferable power transmission shaft, the balance weight has a rivet made of iron-based metal; and a weight body made of iron-based metal and having a penetration hole into which the rivet is inserted. And, the sacrificial metal has a penetration hole into which the rivet is inserted. Further, the balance weight and the sacrificial metal are fixed to the tubular body through the rivet.

As a far preferable power transmission shaft, the sacrificial metal is provided between the balance weight and the rivet.

As a manufacturing method of the power transmission shaft based on the above embodiments and examples, for instance, the followings are raised.

A method of manufacturing a power transmission shaft having a tubular body made of iron-based metal and a balance weight made of iron-based metal and fixed to an outer peripheral surface of the tubular body, comprises: a process of preparing a plurality of balance weights, weights of which are different from each other and at least parts of which are each covered with sacrificial corrosion prevention material that contains metal whose ionization tendency is higher than that of metal forming the tubular body; a process of determining a fixing position to the tubular body and weight of the balance weight according to a rotation imbalance of the power transmission shaft; a process of welding the determined balance weight to the tubular body; and a process of coating the tubular body including the balance weight.

As a preferable method of manufacturing the power transmission shaft, the balance weight is formed into a plate member, and a welding surface between the balance weight and the tubular body is covered with the sacrificial corrosion prevention material.

As a far preferable method of manufacturing the power transmission shaft, the balance weight is curved at a curvature corresponding to a curvature of the outer peripheral surface of the tubular body, and a welding projection is formed on a contact surface of the balance weight with the tubular body.

As a far preferable method of manufacturing the power transmission shaft, the balance weight is formed by stamping out a band-shaped material that is plated with the sacrificial corrosion prevention material.

As a far preferable method of manufacturing the power transmission shaft, the balance weight is formed by, after stamping out a band-shaped material, coating a stamped material with the sacrificial corrosion prevention material.

As a far preferable method of manufacturing the power transmission shaft, an entire surface of the balance weight is covered with the sacrificial corrosion prevention material.

As a far preferable method of manufacturing the power transmission shaft, the balance weight has a rivet made of iron-based metal; and a weight body made of iron-based metal and having a penetration hole into which the rivet is inserted. And, at least one of the rivet and the weight body is covered with the sacrificial corrosion prevention material. Further, the weight body is fixed to the tubular body by welding the rivet.

The invention claimed is:

1. A power transmission shaft comprising:
   a tubular body made of iron-based metal and having, at least at a part of an outer peripheral surface thereof, an uncovered portion that is not covered;
   a balance weight formed into a plate shape with the same iron-based metal as the tubular body, wherein an inner side surface thereof, which faces the uncovered portion of the tubular body, is covered with a first cover layer made of sacrificial corrosion prevention material that contains metal whose ionization tendency is higher than that of metal forming the tubular body, and wherein an outer side surface thereof is covered with a second cover layer made of different material from the first cover layer with the first cover layer being exposed; and
   a projecting portion formed integrally with the balance weight on the inner side surface, which faces the uncovered portion of the tubular body, of the balance weight, wherein the balance weight is fixed to the tubular body with a top end portion, which is not covered with the sacrificial corrosion prevention material, of the projecting portion being welded to the uncovered portion of the tubular body.

2. The power transmission shaft as claimed in claim 1, wherein:
   the first cover layer is formed on an entire surface of the balance weight.

3. The power transmission shaft as claimed in claim 1, wherein:
   the sacrificial corrosion prevention material is made of zinc, magnesium, aluminum or an alloy containing at least one of these metals.

4. A power transmission shaft comprising:
   a tubular body made of iron-based metal; and
   a balance weight having;
   a rivet made of iron-based metal and fixed to the tubular body, and
   a weight body made of iron-based metal and having a penetration hole which the rivet penetrates, wherein at least a part of the weight body is covered with sacrificial corrosion prevention material that contains metal whose ionization tendency is higher than that of metal forming the tubular body,
   wherein the balance weight is fixed to an outer peripheral surface of the tubular body with the rivet, and
   wherein the weight body is fixed to the outer peripheral surface of the tubular body with the rivet penetrating the penetration hole being riveted.

5. A method of manufacturing a power transmission shaft, the power transmission shaft having;
   a tubular body made of iron-based metal and having, at least at a part of an outer peripheral surface thereof, an uncovered portion that is not covered;
   a balance weight formed into a plate shape with the same iron-based metal as the tubular body, wherein an inner side surface thereof, which faces the uncovered portion of the tubular body, is covered with a first cover layer made of sacrificial corrosion prevention material that contains metal whose ionization tendency is higher than that of metal forming the tubular body, and wherein an outer side surface thereof is covered with a second cover layer made of different material from the first cover layer with the first cover layer being exposed; and
   a projecting portion formed integrally with the balance weight on the inner side surface, which faces the uncovered portion of the tubular body, of the balance weight, wherein the balance weight is fixed to the tubular body with a top end portion, which is not covered with the sacrificial corrosion prevention material, of the projecting portion being welded to the uncovered portion of the tubular body,
   the method comprising:
   a process of preparing a plurality of balance weights, weights of which are different from each other and at least inner side surfaces of which are each covered with the first cover layer;
   a process of determining a fixing position of the balance weight to the tubular body and weight of the balance weight according to a rotation imbalance of the power transmission shaft;
   a process of welding the determined balance weight to the uncovered portion of the tubular body through the projecting portion; and
   a process of forming the second cover layer on the outer peripheral surface of the tubular body and the outer side surface of the balance weight by coating the tubular body including the balance weight.

6. The method of manufacturing the power transmission shaft as claimed in claim 5, wherein:
   the balance weight is curved at a curvature corresponding to a curvature of the outer peripheral surface of the tubular body.

7. The method of manufacturing the power transmission shaft as claimed in claim 5, wherein:
   the balance weight is formed by stamping out a band-shaped material that is plated with the first cover layer.

8. The method of manufacturing the power transmission shaft as claimed in claim 5, wherein:
   the balance weight is formed by, after stamping out a band-shaped material, coating a stamped material with the first cover layer.

9. The method of manufacturing the power transmission shaft as claimed in claim 5, wherein:
an entire surface of the balance weight is covered with the first cover layer.

10. A method of manufacturing a power transmission shaft, the power transmission shaft having:
a tubular body made of iron-based metal; and
a balance weight having;
a rivet made of iron-based metal and fixed to the tubular body, and
a weight body made of iron-based metal and having a penetration hole which the rivet penetrates, wherein at least a part of the weight body is covered with sacrificial corrosion prevention material that contains metal whose ionization tendency is higher than that of metal forming the tubular body,
wherein the balance weight is fixed to an outer peripheral surface of the tubular body with the rivet,
the method comprising:
preparing a plurality of weight bodies, weights of which are different from each other;
determining a fixing position of the weight body to the tubular body and a weight of the weight body according to a rotation imbalance of the power transmission shaft;
fixing the rivet to the fixing position of the weight body to the tubular body;
fixing the weight body to the tubular body by making the rivet penetrate the penetration hole of the weight body and riveting the rivet having penetrated the penetration hole; and
forming a second cover layer on the outer peripheral surface of the tubular body and an outer side surface of the balance weight by coating the tubular body including the balance weight.

11. A power transmission shaft comprising:
a tubular body made of iron-based metal;
a balance weight having;
a rivet made of iron-based metal and fixed to the tubular body, and
a weight body made of iron-based metal and having a penetration hole which the rivet penetrates,
wherein the balance weight is fixed to an outer peripheral surface of the tubular body with the rivet; and
a sacrificial metal formed, as a different member from the balance weight, with a plate-shaped metal material whose ionization tendency is higher than that of metal forming the tubular body and having a penetration hole which the rivet penetrates, wherein the sacrificial metal is fixed to the outer peripheral surface of the tubular body with the rivet with the sacrificial metal being in contact with a surface of the weight body,
wherein the weight body and the sacrificial metal are both fixed to the outer peripheral surface of the tubular body with the rivet penetrating the penetration holes being riveted.

12. The power transmission shaft as claimed in claim 11, wherein:
the sacrificial metal is provided between the tubular body and the balance weight.

13. The power transmission shaft as claimed in claim 11, wherein:
the sacrificial metal is made of zinc, magnesium, aluminum or an alloy containing at least one of these metals.

14. The power transmission shaft as claimed in claim 11, wherein:
the sacrificial metal is provided between the balance weight and the rivet.

* * * * *